(12) United States Patent
Zheng et al.

(10) Patent No.: US 11,475,161 B2
(45) Date of Patent: Oct. 18, 2022

(54) DIFFERENTIALLY PRIVATE DATASET GENERATION AND MODELING FOR KNOWLEDGE GRAPHS

(71) Applicant: Accenture Global Solutions Limited, Dublin (IE)

(72) Inventors: Xu Zheng, Dublin (IE); Nicholas McCarthy, Dublin (IE); Jeremiah Hayes, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 329 days.

(21) Appl. No.: 16/887,927

(22) Filed: May 29, 2020

(65) Prior Publication Data

US 2021/0374279 A1   Dec. 2, 2021

(51) Int. Cl.
| | |
|---|---|
| *G06F 21/62* | (2013.01) |
| *G06F 16/28* | (2019.01) |
| *G06N 20/00* | (2019.01) |
| *G06N 7/00* | (2006.01) |
| *G06N 5/02* | (2006.01) |

(52) U.S. Cl.
CPC ........ *G06F 21/6254* (2013.01); *G06F 16/285* (2019.01); *G06N 5/02* (2013.01); *G06N 7/005* (2013.01); *G06N 20/00* (2019.01)

(58) Field of Classification Search
CPC ... G06F 21/6254; G06F 16/285; G06N 20/00; G06N 5/02; G06N 7/005
See application file for complete search history.

(56) References Cited

PUBLICATIONS

Yoon et al., "PATE-GaN: Generating synthetic data with differential privacy guarantees." 7th International Conference on Learning Representations, ICLR 2019, 1-21. (Year: 2019).*
Papemot, N., Goodfellow, I., Abadi, M., Talwar, K., & Erlingsson, Ú. (2019). Semi-supervised knowledge transfer for deep learning from private training data. 5th International Conference on Learning Representations, ICLR 2017—Conference Track Proceedings, (2015), 1-16.
Jordon, J., Yoon, J., & Van Der Schaar, M. (2019). PATE-GaN: Generating synthetic data with differential privacy guarantees. 7th International Conference on Learning Representations, ICLR 2019, 1-21.

(Continued)

*Primary Examiner* — Hee K Song
(74) *Attorney, Agent, or Firm* — Harrity & Harrity, LLP

(57) ABSTRACT

A device may generate a synthetic knowledge graph based on a true knowledge graph, may partition the synthetic knowledge graph into a set of synthetic data partitions, and may determine, using a plurality of teacher models, an aggregated prediction. The aggregated prediction may be based on individual predictions from corresponding individual teacher models included in the plurality of teacher models. The device may determine, using a student model and based on the synthetic knowledge graph and noise, a student prediction. The student model may be trained based on historical synthetic knowledge graphs and historical aggregated predictions associated with the plurality of teacher models. The device may determine an error metric based on the aggregated prediction and the student prediction, and may perform an action associated with the synthetic knowledge graph based on the error metric.

20 Claims, 11 Drawing Sheets

(56) References Cited

PUBLICATIONS

Xie, L., Lin, K., Wang, S., Wang, F., & Zhou, J. (2018). Differentially Private Generative Adversarial Network, http://arxiv.org/abs/1802.06739.

Kipf, T. N., & Welling, M. (2019). Semi-supervised classification with graph convolutional networks. 5th International Conference on Learning Representations, ICLR 2017—Conference Track Proceedings, 1-14.

Wang, H., Wang, J., Wang, J., Zhao, M., Zhang, W., Zhang, F., . . . Guo, M. (2018). Graphgan: Graph representation earning with generative adversarial nets 32nd AAAI Conference on Artificial Intelligence, AAAI 2018, 2508-2515.

Xu, D., Yuan, S., Wu, X., & Phan, H. N. (2018). DPNE: Differentially private network embedding. Lecture Notes in Computer Science (Including Subseries Lecture Notes in Artificial Intelligence and Lecture Notes in Bioinformatics), 10938 LNAI, 235-246. https://doi.org/10.1007/978-3-319-93037-4_19.

\* cited by examiner

DIFFERENTIALLY PRIVATE DATASET GENERATION AND MODELING FOR KNOWLEDGE GRAPHS

BACKGROUND

Differential privacy is a system for publicly sharing information about a dataset by describing the patterns of groups within the dataset (e.g., a distribution of data) while withholding information about individuals in the dataset. An algorithm may be referred to as a differentially private algorithm if an observer seeing output of the algorithm cannot tell if a particular individual's information was used to compute the output. Differential privacy is often discussed in the context of identifying individuals whose information may be in a database. Differentially private algorithms may be used, for example, to publish demographic information or other statistical aggregates while ensuring confidentiality of survey responses, and/or to collect information about user behavior while controlling what information is visible.

SUMMARY

According to some implementations, a method may include receiving, by a device, a true knowledge graph that is representative of a dataset; obtaining, by the device, a true adjacency matrix and a true attribute matrix for the true knowledge graph; partitioning, by the device, the real adjacency matrix and the real attribute matrix into a set of true data partitions; generating, by the device and based on a noise vector, a synthetic knowledge graph that includes a synthetic adjacency matrix and a synthetic attribute matrix; partitioning, by the device, the synthetic adjacency matrix and the synthetic attribute matrix into a set of synthetic data partitions; determining, by the device and using a first teacher model, a first partition score that is based on a comparison of a first synthetic data partition, of the set of synthetic data partitions, and a first true data partition of the set of true data partitions; determining, by the device and using a second teacher model, a second partition score that is based on a comparison of a second synthetic data partition, of the set of synthetic data partitions, and a second true data partition of the set of true data partitions; determining, by the device, an aggregated score based on the first partition score and the second partition score; determining, by the device and using a student model, a student prediction label associated with the synthetic knowledge graph ; determining, by the device and using the student model, a classification loss based on the student prediction label and the aggregated score; and outputting, by the device and if the classification loss satisfies a condition, a model used to generate the synthetic knowledge graph.

According to some implementations, a device may include one or more memories and one or more processors. In some implementations, the one or more processors are communicatively coupled to the one or more memories. The one or more processors may be configured to: generate, using a graph generator model, a synthetic knowledge graph based on a true knowledge graph that is representative of a dataset; partition the synthetic knowledge graph into a set of synthetic data partitions; partition the true knowledge graph into a set of true data partitions; determine, using a first teacher model, a first prediction that is based on a first true data partition, of the set of true data partitions, and a first synthetic data partition of the set of synthetic data partitions; determine, using a second teacher model, a second prediction that is based on a second true data partition, of the set of true data partitions, and the true knowledge graph and a second synthetic data partition of the set of synthetic data partitions, wherein the first teacher model and the second teacher model are independently trained using disjoint data partitions of the true knowledge graph; determine, using a student model, a third prediction based on the synthetic knowledge graph, wherein the student model is trained based on historical synthetic knowledge graphs and historical output, from the first teacher model and the second teacher mode, corresponding to the historical synthetic knowledge graphs; determine a classification loss based on the third prediction and an aggregated prediction that is based on the first prediction, the second prediction, and noise; and perform an action, associated with the synthetic knowledge graph or a model used to generate the synthetic knowledge graph, based on the classification loss.

According to some implementations, a non-transitory computer-readable medium may store one or more instructions. The one or more instructions, when executed by one or more processors of a device, may cause the one or more processors and/or the device to: generate a synthetic knowledge graph based on a true knowledge graph that includes data; partition the synthetic knowledge graph into a set of synthetic data partitions; determine, using a plurality of teacher models, an aggregated prediction that indicates a first probability that the synthetic knowledge graph represents true data or synthetic data, wherein the aggregated prediction is based on individual predictions from corresponding individual teacher models included in the plurality of teacher models; determine, using a student model and based on the synthetic knowledge graph, a student prediction that indicates a second probability that the synthetic knowledge graph represents true data or synthetic data, wherein the student model is trained based on historical synthetic knowledge graphs and historical aggregated predictions associated with the plurality of teacher models; apply noise to the aggregated prediction to generate a noisy aggregation prediction; determine an error metric based on the noisy aggregated prediction and the student prediction; and perform an action associated with the synthetic knowledge graph or a model used to generate the synthetic knowledge graph based on the error metric.

DETAILED DESCRIPTION

Figure 1A:
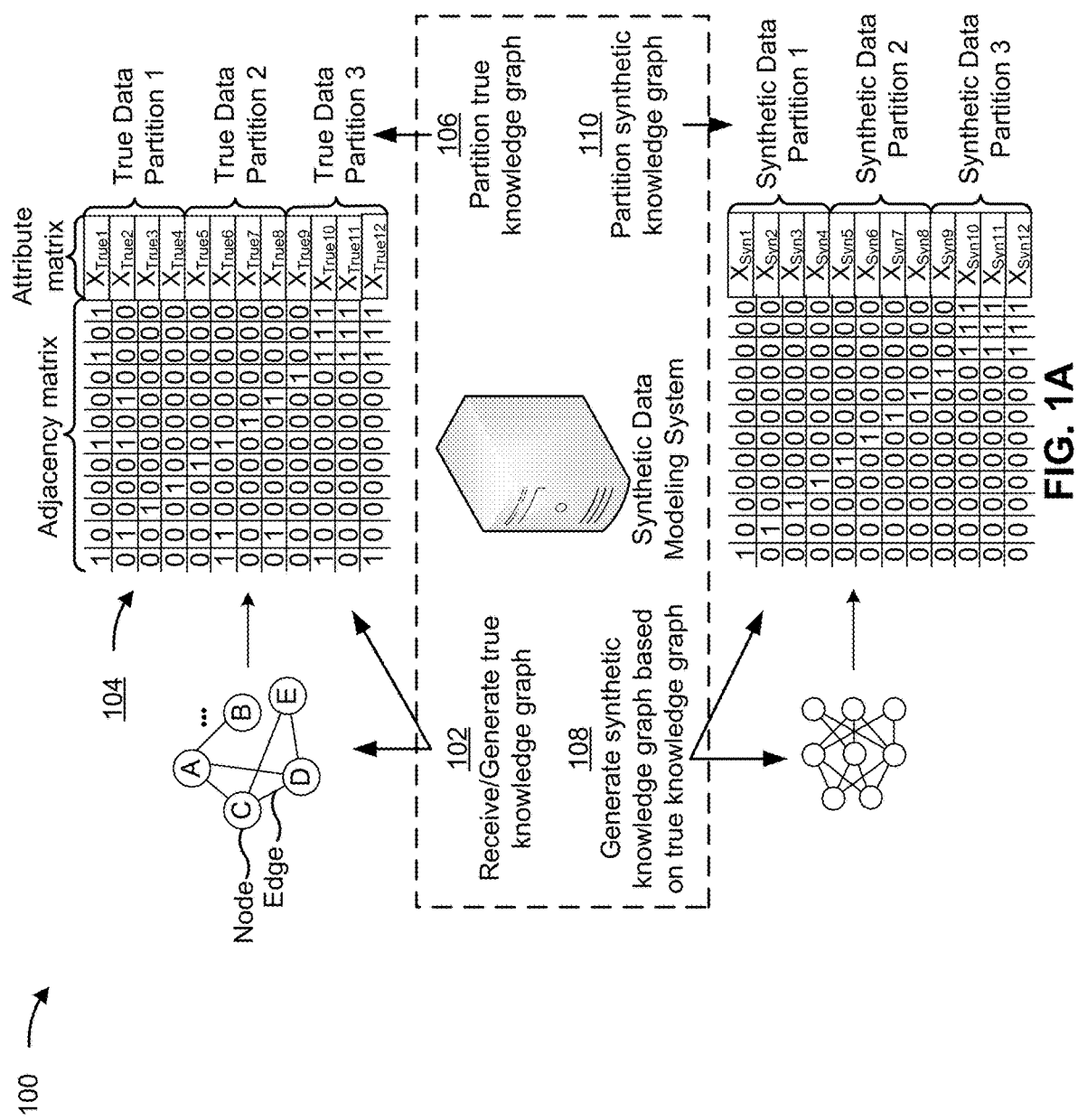
FIGS. 1A-1F are diagrams of an example implementation described herein.

The following detailed description of example implementations refers to the accompanying drawings. The same reference numbers in different drawings may identify the same or similar elements.

Differential privacy can be used to protect sensitive data, such as personally identifiable information (PII), medical or health data, demographic data, financial data, education data, customer data, confidential data, and/or the like. For example, sensitive data in a true dataset (e.g., an actual dataset, a real dataset, and/or the like, that contains real data about individuals or entities) can be kept private by generating a differentially private dataset with the same or similar statistical characteristics as the true dataset. However, using a generated differentially private dataset rather than a true dataset reduces the utility and accuracy of analyses performed on the differentially private dataset as compared to performing the same analyses on the true dataset. Furthermore, some datasets, like knowledge graphs, represent complex interconnections between entities (e.g., nodes), and generating an accurate differentially private dataset for such complex datasets is computationally complex.

For example, a knowledge graph may represent a collection of interlinked descriptions of entities, such as people, real-world objects, events, situations, or abstract concepts. A knowledge graph includes a set of nodes and interconnections between nodes. The nodes may represent the same type of entity (e.g., people), or a node may have a node type that indicates a type of entity represented by the node. A node may be associated with a set of attributes that define characteristics of the node (e.g., height, weight, and gender for a node that represents a person). Interconnections between nodes may be referred to as edges. In some cases, edges may have different edge types that represent different relationships between nodes. Additionally, or alternatively, edges may have different attributes, such as a weight that indicates a strength of a relationship. Due to the complex nature of knowledge graphs, capturing these complexities to generate a differentially private knowledge graph (e.g., a dataset that represents a knowledge graph) that enables accurate analyses to be performed (e.g., as a result of having the same or similar statistical characteristics as a true knowledge graph with true data) is computationally complex.

Some implementations described herein enable a synthetic data modeling system to generate a differentially private synthetic knowledge graph that permits accurate statistical analyses to be performed. As a result, information security can be enhanced using differential privacy while also enabling highly relevant and accurate analyses to be performed on the differentially private synthetic knowledge graph.

FIGS. 1A-1F are diagrams of an example 100 associated with differentially private dataset generation and modeling for knowledge graphs. As shown in FIGS. 1A-1F, example 100 includes a synthetic data modeling system, which may be implemented on one or more servers or within a cloud computing environment, among other examples. Although the term "knowledge graph" is used herein, the operations described herein may be performed in connection with any type of graph that includes nodes and edges.

As shown in FIG. 1A, and by reference number 102, the synthetic data modeling system may receive (e.g., from a data source) or may generate a true knowledge graph. As described above, a knowledge graph may include a set of nodes that represent entities. The knowledge graph may also include a set of edges, where each edge connects or indicates a relationship between a pair of nodes. In some cases, such as a unigraph, all edges in a knowledge graph may indicate a single type of relationship between nodes (e.g., a two-way relationship). In other cases, such as a multigraph (e.g., a directed graph), different edges in a knowledge graph may indicate the same type of relationship or a different type of relationship between nodes (e.g., a one-way relationship in a first direction, a one-way relationship in a second direction, a two-way relationship, a type of relationship, and/or the like). In some cases, the nodes of a graph (e.g., a unigraph or a multigraph) may not be associated with any attributes. In other cases, the nodes of a graph (e.g., a unigraph or a multigraph) may be associated with a set of (e.g., one or more) node attributes. In some cases, edges of a graph may be associated with a set of (e.g., one or more) edge characteristics.

As an example, and as shown by reference number 104, a true knowledge graph received or generated by the synthetic data modeling system includes twelve nodes, represented by the 12 rows of a matrix representation of the true knowledge graph. As shown, the matrix representation for an example graph with attributes includes an adjacency matrix and an attribute matrix. An adjacency matrix of a true knowledge graph may be referred to as a true adjacency matrix, and an attribute matrix of a true knowledge graph may be referred to as a true attribute matrix. The attribute matrix is sometimes referred to as a feature matrix because the elements of the attribute matrix can be used as features for training and/or applying a machine learning model.

An adjacency matrix may include a square matrix used to represent a finite graph, where the elements (e.g., cells, entries, and/or the like) of the matrix indicate whether pairs of nodes are adjacent (e.g., connected) in the graph. The zeros and ones in the adjacency matrix indicate whether a pair of nodes corresponding to an element in the adjacency matrix are connected by an edge. For example, a value of one in row 1, column 6 of the adjacency matrix indicates that node 1 and node 6 are connected by an edge. As another example, a value of zero in row 2, column 3 of the adjacency matrix indicates that node 2 and node 3 are not connected by an edge.

In the true knowledge graph of example 100, each node is associated with a set of attributes. The attributes for all nodes in the true knowledge graph are represented by an attribute matrix that includes a row for each node in the true knowledge graph and one or more columns with values for the attributes of the node. In FIG. 1A, a single row (e.g., an attribute vector) of the attribute matrix is represented by $X_{True k}$, where k is a node index. Thus, a first set of attributes for node 1 is represented as $X_{True1}$, a second set of attributes for node 2 is represented as $X_{True2}$, and so on.

As used herein, the term "true knowledge graph" refers to a knowledge graph that is to be kept private, such as by generating a differentially private synthetic knowledge graph with the same or similar statistical characteristics as the true knowledge graph. The true knowledge graph may include real-world data. The real-world data may include sensitive data, as described above. In some implementations, the synthetic data modeling system may generate the true knowledge graph from data input to and/or received by the synthetic data modeling system (e.g., from a data source). Alternatively, the synthetic data modeling system may receive the true knowledge graph (e.g., from a data source, based on user input, and/or the like).

As shown by reference number 106, the synthetic data modeling system may partition the true knowledge graph into multiple partitions (shown as true data partitions). Each true data partition may include data for a subset of nodes included in the true knowledge graph. For example, each true data partition may include data from a row corresponding to a node included in the subset and node attributes of the node. In example 100, the synthetic data modeling system partitions the true knowledge graph into three partitions, where a first partition includes data for nodes 1 through 4, a second partition includes data for nodes 5 through 8, and a third partition includes data for nodes 9 through 12. Additional details regarding knowledge graph partitioning, including attribute partitioning and edge partitioning, are described below in connection with FIG. 1B.

As shown by reference number 108, the synthetic data modeling system may generate a synthetic knowledge graph based on the true knowledge graph. As used herein, the term "synthetic knowledge graph" refers to a knowledge graph that can be shared publicly because the synthetic knowledge graph does not include real-world data, unlike the true knowledge graph. For example, the synthetic knowledge graph may include randomly generated data or pseudo-randomly generated data, which may be generated using a noise vector (e.g., a latent noise vector or matrix, a random value, a set of random values, a random vector or matrix, Gaussian noise vector or matrix, a Gaussian white noise vector or matrix, and/or the like). In some implementations, the synthetic data modeling system may generate a synthetic knowledge graph with a same number of nodes as the true knowledge graph. Alternatively, the synthetic data modeling system may generate a synthetic knowledge graph with a different number of nodes than the true knowledge graph. In some implementations, the synthetic data modeling system may generate a synthetic knowledge graph with a same set of attributes as the true knowledge graph. As shown, the synthetic knowledge graph includes an adjacency matrix and an attribute matrix, as described above. An adjacency matrix of a synthetic knowledge graph may be referred to as a synthetic adjacency matrix, and an attribute matrix of a synthetic knowledge graph may be referred to as a synthetic attribute matrix. As further shown, each node in the synthetic knowledge graph is associated with a set of attributes, represented by $X_{Synk}$, where k is a node index.

The synthetic knowledge graph generated by the synthetic data modeling system may initially not have the same or similar statistical characteristics (e.g., distribution of data, averages, means, medians, modes, standard deviations, and/or the like) as the true knowledge graph. Using techniques described below, the synthetic data modeling system may use an iterative process to update the synthetic knowledge graph and/or generate a new synthetic knowledge graph that does have the same or similar statistical characteristics as the true knowledge graph. As a result, these techniques enable the synthetic data modeling system to create a differentially private synthetic knowledge graph that share the same or similar statistical characteristics of the true knowledge graph while maintaining privacy of data included in the true knowledge graph.

As shown by reference number 110, the synthetic data modeling system may partition the synthetic knowledge graph into multiple partitions (shown as synthetic data partitions), in a similar manner as described above in connection with the true knowledge graph. Each synthetic data partition may include data for a subset of nodes included in the synthetic knowledge graph. For example, each synthetic data partition may include data from a row corresponding to a node included in the subset and node attributes of the node. In example 100, the synthetic data modeling system partitions the synthetic knowledge graph into three partitions, where a first partition includes data for nodes 1 through 4, a second partition includes data for nodes 5 through 8, and a third partition includes data for nodes 9 through 12.

In some implementations, the synthetic data modeling system may partition the true knowledge graph and the synthetic knowledge graph into the same quantity of partitions. In example 100, the synthetic data modeling system partitions the true knowledge graph and the synthetic knowledge graph into three partitions each, but other quantities of partitions may be used in other examples. In some implementations, the quantity of partitions may depend on the size of the true knowledge graph, a quantity of nodes included in the true knowledge graph, a quantity of edges of the true knowledge graph, an average quantity of attributes of the nodes in the true knowledge graph, a variation of types of the attributes of the nodes, a variation of types of the edges of the true knowledge graph, a type of the true knowledge graph (e.g., a unigraph, a multigraph, a unigraph with attributes, a multigraph with attributes, among other examples), and/or the like.

Figure 1B:
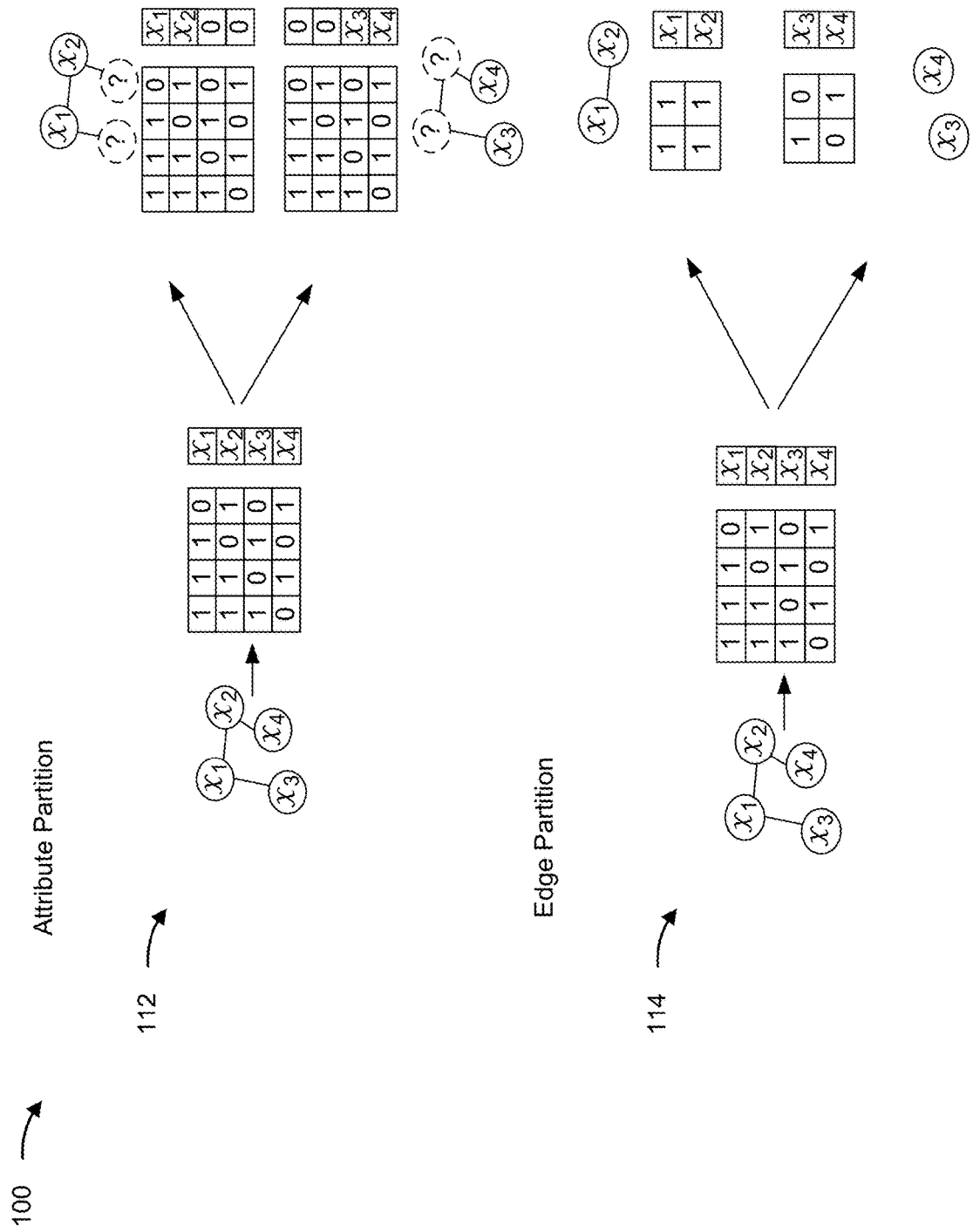

FIG. 1B shows examples of knowledge graph partitioning, which may be used to partition the true knowledge graph and/or the synthetic knowledge graph, as described above in connection with FIG. 1A. In some implementations, the synthetic data modeling system may use attribute partitioning to partition the true knowledge graph and/or the synthetic knowledge graph. Alternatively, the synthetic data modeling system may use edge partitioning to partition the true knowledge graph and/or the synthetic knowledge graph. Alternatively, the synthetic data modeling system may use another partitioning technique to partition the true knowledge graph and/or the synthetic knowledge graph.

In some implementations, the synthetic data modeling system may use the same partitioning technique to partition both the true knowledge graph and the synthetic knowledge graph to assist with generating a synthetic knowledge graph that has the same or similar statistical characteristics as the true knowledge graph. In some implementations, the partitioning may be performed randomly or pseudo-randomly (e.g., by random selection of nodes to be included in a partition), may be performed according to node proximity (e.g., to group nodes that are connected to one another in the same partition to preserve information integrity), and/or the like. Furthermore, using the partitioning techniques described herein enables the synthetic data modeling system to generate disjoint partitions, which can be used to train different teacher models (e.g., one teacher model for each partition) to achieve differential privacy, as described in more detail below.

As shown by reference number 112, using attribute partitioning, the synthetic data modeling system may partition a knowledge graph such that each partition includes an unpartitioned adjacency matrix (e.g., from the original knowledge graph that is being partitioned) and includes only the attribute vectors for the nodes that are included in that partition. As a simple example, for a knowledge graph with four nodes (e.g., 1, 2, 3, and 4), attribute partitioning can be used to create a first partition that includes the entire adjacency matrix from the unpartitioned knowledge graph (e.g., indicating all relationships among nodes 1, 2, 3, and 4) and includes only the attribute vectors for nodes 1 and 2 (shown as $x_1$ and $x_2$) and not the attribute vectors for nodes 3 and 4 (shown as $x_3$ and $x_4$), and to create a second partition that includes the entire adjacency matrix from the unpartitioned knowledge graph and includes only the attribute vectors for nodes 3 and 4 (shown as $x_3$ and $x_4$) and not the attribute vectors for nodes 1 and 2 (shown as $x_1$ and $x_2$). Attribute partitioning may lead to more accurate modeling (e.g., more accurate predications and/or statistical analyses) as compared to edge partitioning, but may reduce differential privacy.

As shown by reference number 114, using edge partitioning, the synthetic data modeling system may partition a knowledge graph such that each partition includes only a portion of the unpartitioned adjacency matrix (e.g., from the original knowledge graph that is being partitioned) that includes data for the nodes included in that partition and includes only the attribute vectors for the nodes that are included in that partition. In this case, the portion of the unpartitioned adjacency matrix for a partition indicates only connections (or lack thereof) between pairs of nodes that are both included in the partition. Edge partitioning may lead to increased differential privacy as compared to attribute partitioning, but may result is less accurate modeling.

In some implementations, the synthetic data modeling system may select a partitioning technique (e.g., attribute partitioning, edge partitioning, and/or the like) based on a type of graph being partitioned. For example, if the graph does not include attributes, then the synthetic data modeling system may select edge partitioning.

Figure 1C:
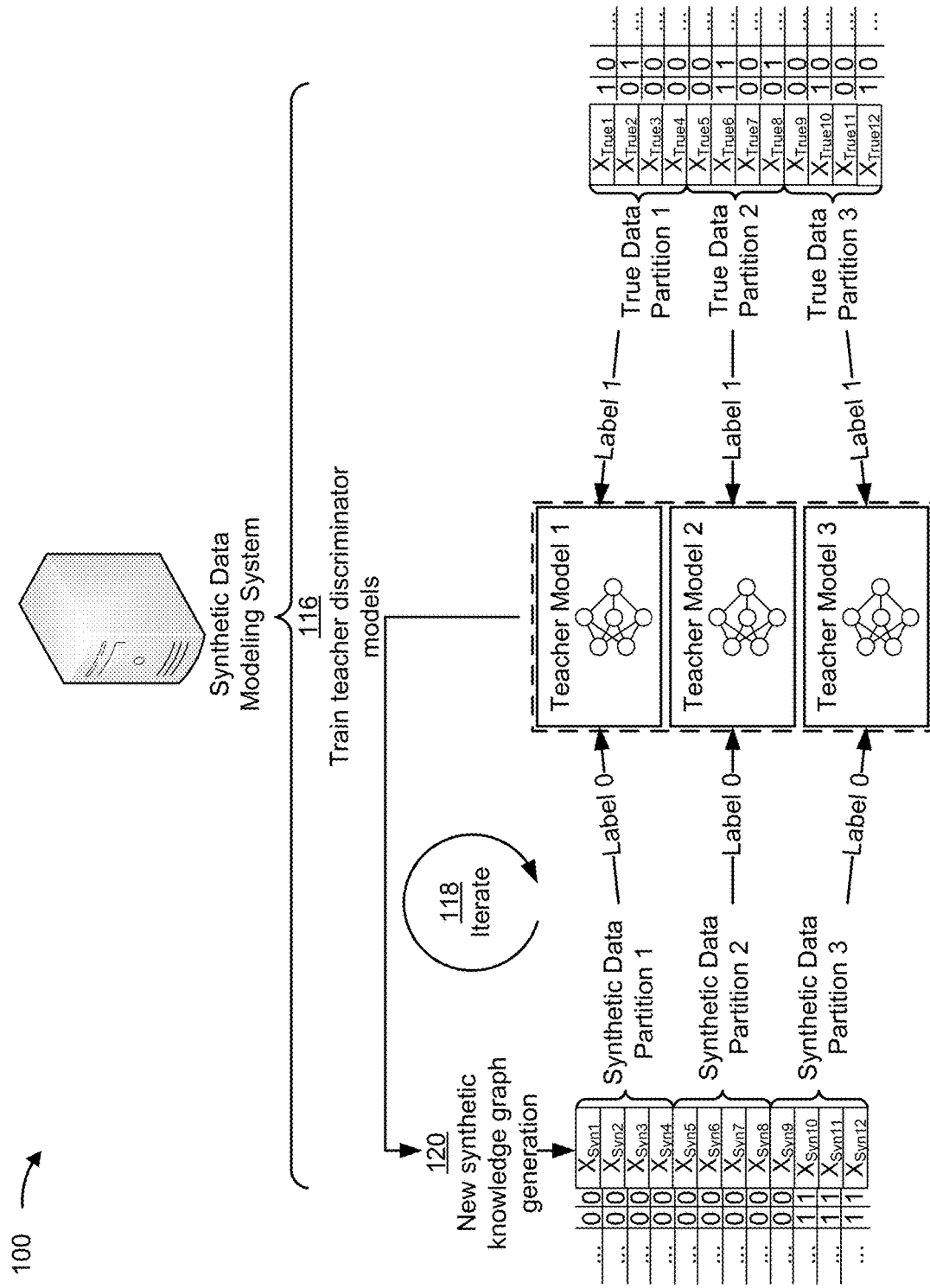

As shown in FIG. 1C, and by reference number 116, the synthetic data modeling system may train a set of teacher models (e.g., machine learning models) using the true data partitions of the true knowledge graph and the synthetic data partitions of the synthetic knowledge graph, which may be generated by the synthetic data modeling system as described above. For example, the synthetic data modeling system may partition the true knowledge graph into a quantity of partitions, may partition the synthetic knowledge graph into the same quantity of partitions, and may use those partitions to train the same quantity of teacher models. In this case, each teacher model is provided with input from a single partition of the true knowledge graph and a single partition of the synthetic knowledge graph (and not input from other partitions), thereby enhancing differential privacy. In some implementations, a teacher model is trained and/or used as a discriminator model in a generative adversarial network (GAN) model, as described in more detail below.

As an example, the synthetic data modeling system may train a first teacher model (shown as Teacher Model 1) using a first partition from the synthetic knowledge graph (shown as Synthetic Data Partition 1) and using a first partition from the true knowledge graph (shown as True Data Partition 1). As shown, the synthetic data modeling system may label (e.g., categorize, classify, and/or the like) the partition from the synthetic knowledge graph with a first label (shown as 0) to indicate that the partition includes synthetic data (e.g., from the synthetic knowledge graph), and may label the partition from the true knowledge graph with a second label (shown as 1) to indicate that the partition includes true data (e.g., from the true knowledge graph). The teacher model may be trained, using the labeled inputs, to differentiate between (or determine probability or confidence scores for) true data and synthetic data by applying a machine learning algorithm, as described in more detail below in connection with FIG. 2. Each teacher model may be trained in this manner, either using the same machine learning model or different machine learning models for training on respective partitions.

As shown by reference number 118, the synthetic data modeling system may apply an iterative process to train the teacher models. For example, the training may include generation of a prediction for unlabeled data (or labeled data with the prediction being generated prior to analyzing the label, such as for data included in a test set), by a teacher model. The prediction may include a probability score indicative of a probability (sometimes referred to as a confidence score) that the data is true data and/or a probability that the data is synthetic data. For example, a prediction of 1 may indicate 100% probability or confidence that input data is true data (and 0% probability that the input data is synthetic data), a prediction of 0 may indicate 0% probability or confidence that input data is true data (and 100% probability that the input data is synthetic data), a prediction of 0.58 may indicate 58% probability or confidence that input data is true data (and 42% probability that the input data is synthetic data), and so on.

A teacher model may generate a prediction for input data and may compare the prediction to a label associated with the input data. The difference between the prediction and the label may indicate a classification error (e.g., a classification loss) associated with the prediction. As shown by reference number 120, the synthetic data modeling system may generate a new synthetic knowledge graph, such as by updating the previously provided synthetic knowledge graph, by randomly generating data for a synthetic knowledge graph, and/or the like. In some implementations, the synthetic data modeling system may generate a synthetic knowledge graph with a machine learning objective of maximizing the classification error, and the teacher model may have a machine learning objective of minimizing the classification error. This may be referred to as a GAN model (e.g., along with the student model described below), with the synthetic knowledge graph being generated by a generator of the GAN model, and each teacher model acting as a discriminator of the GAN model. In an example GAN model, teacher models may be trained to determine statistical information of the true knowledge graph, and a student model and the generator may be trained adversely (e.g., with adverse objectives regarding the classification loss) using the teacher models. In some cases, the generator may be referred to as a graph generator model.

As a simple example, if the classification error is large, then the synthetic data modeling system may generate a new synthetic knowledge graph with relatively minor changes as compared to a synthetic knowledge graph of a preceding iteration (e.g., fewer changed values, smaller deviations from prior values, and/or the like), whereas if the classification error is small, then the synthetic data modeling system may generate a new synthetic knowledge graph with relatively major changes (e.g., more changed values, larger deviations from prior values, and/or the like) as compared to a synthetic knowledge graph of a preceding iteration. Using machine learning, the generator may determine the values and positions of those values (e.g., in elements of the adjacency matrix and/or the attribute matrix) that tend to result in a larger classification error, and may generate a new synthetic knowledge graph that includes those values in those positions to attempt to increase the classification error. By receiving a label for data and/or comparing a prediction to the label, a teacher model and/or a student model may determine values and/or positions of those values that are more or less indicative of true data (or synthetic data), and may update subsequent predictions accordingly (e.g., by learning from the labeled data) to reduce the classification error.

In some implementations, the synthetic data modeling system may repartition the true knowledge graph and/or the new synthetic knowledge graph for different iterations, in a similar manner as described above. In this way, the teacher models and/or the student model are not biased toward a particular pattern of data indicated in the same partition for multiple iterations. The operations described above may be performed for each teacher model, such that each teacher model receives an independent (e.g., disjoint) partition of the synthetic knowledge graph and an independent (e.g., disjoint) partition of the true knowledge graph and generates an independent prediction based on the received partition(s).

The synthetic data modeling system may train the teacher models by repeating the iterative process described above (e.g., along with the processes described below in connection with FIGS. 1D and 1E) until a stopping condition is satisfied. The stopping condition may include, for example, a threshold quantity of iterations being performed, one or more (e.g., all) of the teacher models and/or the student model generating predictions for which a classification error satisfies a threshold (e.g., is less than the threshold, is less than or equal to the threshold, and/or the like), one or more (e.g., all) of the teacher models and/or the student model generating predictions for which a classification error satisfies a threshold for a threshold number of iterations (e.g., a stability condition), a convergence condition, input from a user or operator who has inspected the generated synthetic knowledge graph, and/or the like.

Figure 1D:
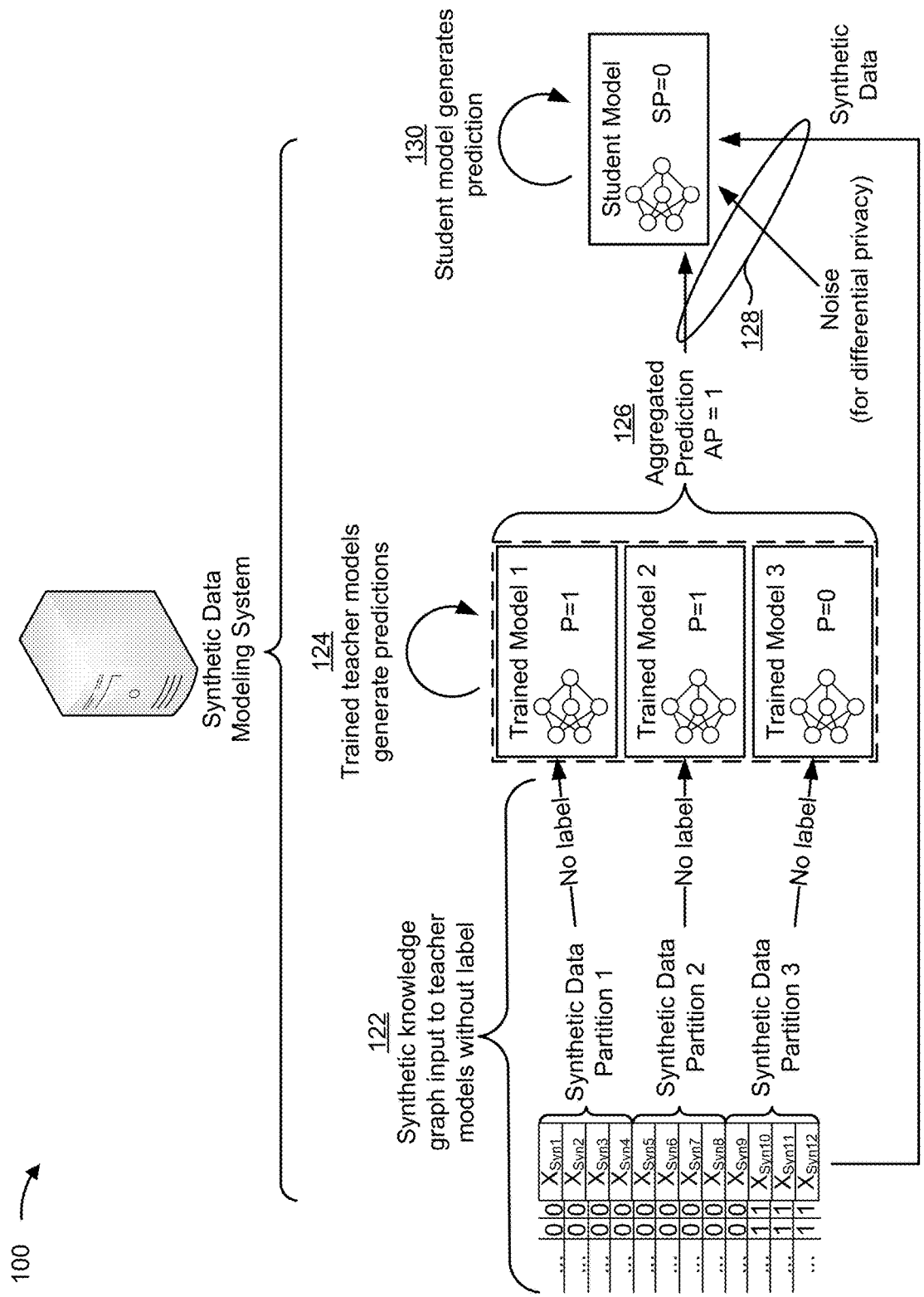

As shown in FIG. 1D, after the teacher models have been trained (or as part of an iterative process for training the teacher models), the teacher models may be used to train a student model. As shown by reference number 122, the synthetic data modeling system may input partitioned synthetic data from a generated synthetic knowledge graph into the teacher models, in a similar manner as described above. However, in this case, the synthetic data partitions may be unlabeled, in some implementations. The synthetic data modeling system may use a trained generator to generate the synthetic knowledge graph, where the generator has been trained using a GAN model, as described above in connection with FIG. 1C.

As shown by reference number 124, the trained teacher models may generate predictions based on the synthetic data partitions. As described above, a prediction may indicate a probability (sometimes referred to as a confidence score) that the data is true data and/or a probability that the data is synthetic data. In some implementations, the probability may be a binary value, which may include a zero (indicating a prediction that the data is not true data) or a one (indicating a prediction that the data is true data). As shown, each teacher model may receive a different (e.g., disjoint) partition, and each teacher model may independently generate a prediction (sometimes called a score, a partition score, and/or the like) based on the partition received by that teacher model and the prior training of that teacher model. Each teacher model may apply a respective machine learning algorithm (e.g., according to the training of that teacher model) to determine the prediction, as described in more detail below in connection with FIG. 3. In some implementations, a prediction by a teacher model may be based on a synthetic data partition input to the teacher model and a true data partition input to the teacher model. For example, a teacher model may generate a prediction by comparing values, statistical properties, attributes, attribute values, adjacency values, and/or the like of a synthetic data partition and a true data partition.

In example 100, the first teacher model may generate a prediction (a partition score) of 1 for the first partition, which indicates a prediction that the input data in the first partition is true data. The second teacher model generate a prediction (a partition score) of 1 for the second partition, which indicates a prediction that the input data in the first partition is true data. The third teacher model generate a prediction (a partition score) of 0 for the third partition, which indicates a prediction that the input data in the first partition is not true data. As another example, using a range of prediction values rather than a binary prediction value, the first teacher model may generate a prediction of 0.623 for the first partition, which indicates a 62.3% probability (or confidence) that the input data in the first partition is true data (and a 37.7% probability that the input data is synthetic data). The second teacher model generate a prediction of 0.532 for the second partition, which indicates a 53.2% probability (or confidence) that the input data in the second partition is true data (and a 46.8% probability that the input data is synthetic data). The third teacher model generate a prediction of 0.325 for the third partition, which indicates a 32.5% probability (or confidence) that the input data in the third partition is true data (and a 67.5% probability that the input data is synthetic data).

As shown by reference number 126, the synthetic data modeling system may generate an aggregated prediction (sometimes called an aggregated prediction score, an aggregated score, an aggregated label, and/or the like) based on the predictions generated by the teacher models. The aggregated prediction may be determined based on a vote count of the individual teacher predictions. For example, if the teacher models generated more ones than zeros, then the aggregated prediction may be a one (indicating a prediction that the input knowledge graph contains true data). Conversely, if the teacher models generated more zeros than ones, then the aggregated prediction may be a zero (indicating a prediction that the input knowledge graph does not contain true data). In some implementations, the aggregated prediction may be, for example, an average of the predictions generated by the teacher models, a weighted average of the predictions generated by the teacher models (e.g., with different weights being assigned to different teacher models depending on, for example, model performance measured in association with model training), or another value determined based on the predictions generated by the teacher models.

As shown by reference number 128, the aggregated prediction may be provided to a student model along with noise (e.g., Gaussian noise) and/or synthetic data from the synthetic knowledge graph (e.g., all of the synthetic data from the synthetic knowledge graph, one or more of the synthetic partitions, all of the synthetic partitions, and/or the like). In some implementations, noise may be applied to the aggregated prediction (e.g., to generate a noisy aggregated prediction, an aggregate noise label, and/or the like) by including additional votes (e.g., ones or zeros) that were not generated by a teacher model, and by counting those votes when determining the aggregated prediction. In example 100, if two votes of zero are added to the votes of one, one, and zero from the teacher models, then the aggregated prediction would become a zero due to the individual predictions and the noise including more zeros than ones (e.g., if the aggregated prediction is determined by a majority vote). In some implementations, noise may be applied to the synthetic data (e.g., to modify one or more values of the synthetic knowledge graph data input to the teacher models prior to input to the student model). Additionally, or alternatively, noise may be applied to the aggregated prediction (e.g., by modifying a value of the aggregated prediction). The application of noise to the input provided to the student model enhances differential privacy.

As shown by reference number 130, the student model may generate a prediction for the input data, sometimes referred to as a student prediction, a label, a student label, a student prediction label, a score, a student score, and/or the like. As described above, the student prediction may include a probability score indicative of a probability (or a confidence) that the input data is true data and/or a probability that the data is synthetic data. This student prediction may be generated by applying a machine learning algorithm, in a similar manner as described elsewhere herein. In some implementations, the aggregated prediction may be used as a label for training the student model. As a result, the teacher models may be used to train the student model, using noisy synthetic data as input with a label of the aggregated prediction, to differentiate between (or determine probability or confidence scores for) true data and synthetic data by applying a machine learning algorithm, as described in more detail below in connection with FIG. 2.

Figure 1E:
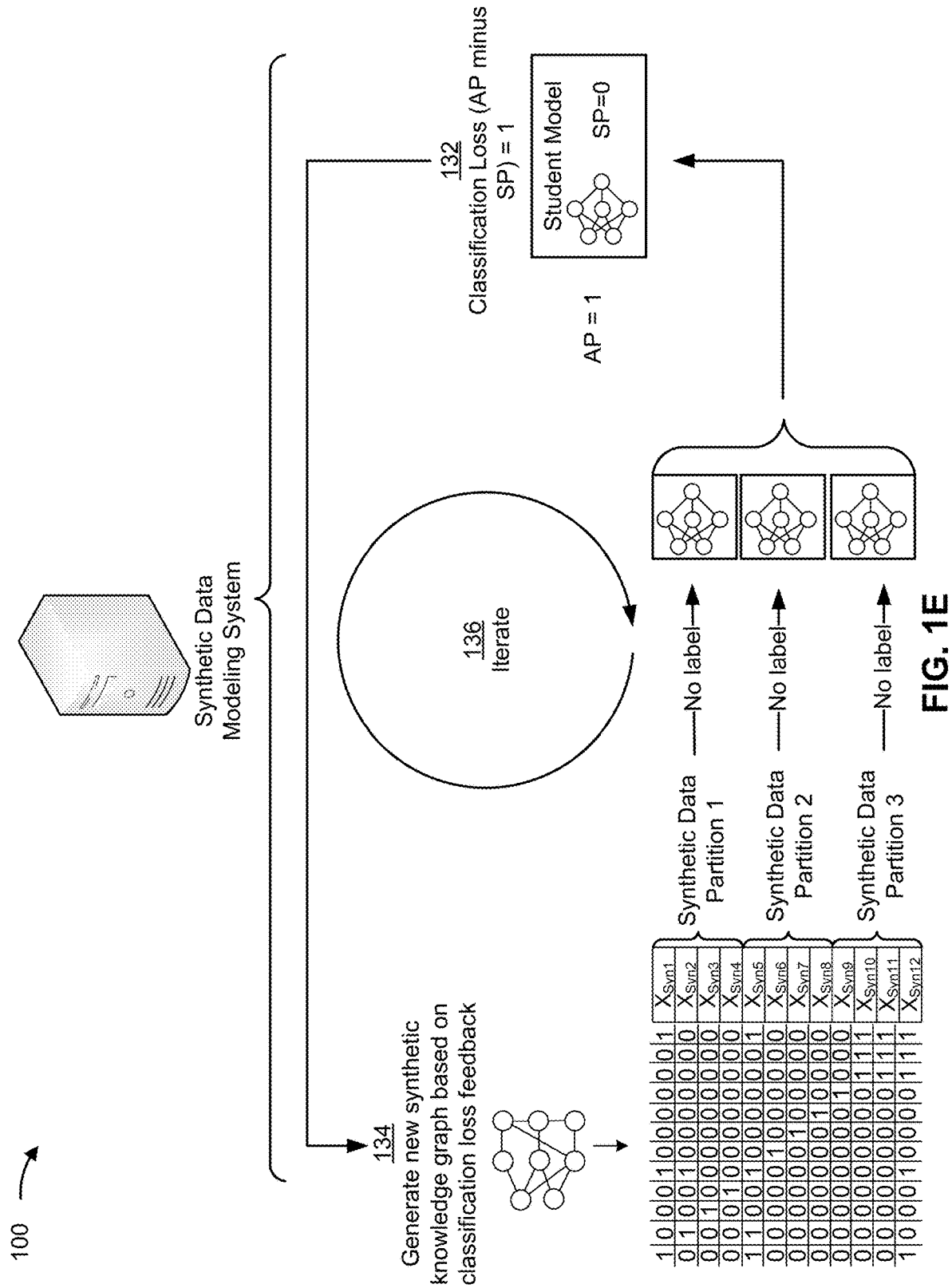

As shown in FIG. 1E, the synthetic data modeling system may determine a classification error associated with the prediction of the student model, sometimes referred to as a classification loss. In some implementations, the classification loss may be calculated as a difference between the aggregated prediction (shown as AP) and the student prediction (shown as SP). The difference may be an absolute difference (e.g., an absolute value) without an accompanying positive or negative sign, or may be a relative difference with an accompanying positive or negative sign (e.g., indicating whether the student prediction was greater than or less than the aggregated prediction, which indicates whether the aggregated prediction or the student prediction was more accurate). Alternatively, the classification loss may be calculated as an error metric other than a difference, such as a percentage error. In example 100, the aggregated prediction is 1, the student prediction is 0, and the classification loss is 1. As another example, if the aggregated prediction is 0.493 and the student prediction is 0.293, then the classification loss would be 0.200.

As shown by reference number 134, the synthetic data modeling system may generate a new synthetic knowledge graph based on feedback associated with the classification loss, as described above. For example, the feedback may indicate a value of the classification loss, a value of the aggregated prediction, a value of the student prediction, and/or the like. In a similar manner as described above, the synthetic data modeling system may generate a new synthetic knowledge graph with a machine learning objective of maximizing the classification error, and the student model may use a machine learning objective of minimizing the classification error. Thus, the synthetic knowledge graph may be generated by a generator of a GAN model, and the student model may act as a discriminator of the GAN model. In some implementations, the new synthetic knowledge graph generated by the synthetic data modeling system may be used to train (e.g., re-train, update, etc.) a set of teacher models, as described above in connection with FIG. 1C. In some implementations, the process shown in FIG. 1C may be performed one or more times (e.g., using one or more iterations, until a stopping condition is met, and/or the like) to train the teacher models. The trained (e.g., updated) teacher models may then be used to generate predictions used as input to a student model, as described above in connection with FIG. 1D. The student model may use those predictions to determine a classification loss, as described in connection with FIG. 1E. In some implementations, the process shown in FIGS. 1D and 1E may be performed one or more times (e.g., using one or more iterations, until a stopping condition is met, and/or the like) to train the student model and the generator.

As shown by reference number 136, the synthetic data modeling system may train the student model by repeating the iterative process described above (e.g., in connection with FIGS. 1C-1E) until a stopping condition is satisfied. The stopping condition may include, for example, a threshold quantity of iterations being performed, the student model generating predictions for which a classification error satisfies a threshold (e.g., is less than the threshold, is less than or equal to the threshold, and/or the like), the student model generating predictions for which a classification error satisfies a threshold for a threshold number of iterations (e.g., a stability condition), a convergence condition, a stabilization of a classification loss of the student model (e.g., within a threshold range), and/or the like. In some implementations, the synthetic data modeling system may apply different noise (e.g., different noise factors, different noise values, and/or the like) across different iterations, may repartition the synthetic knowledge graph across different iterations (e.g., using different nodes or node indexes in a particular partition across iterations), and/or the like. In this way, the student model is not biased toward a particular pattern of data indicated in the same partition for multiple iterations.

Figure 1F:
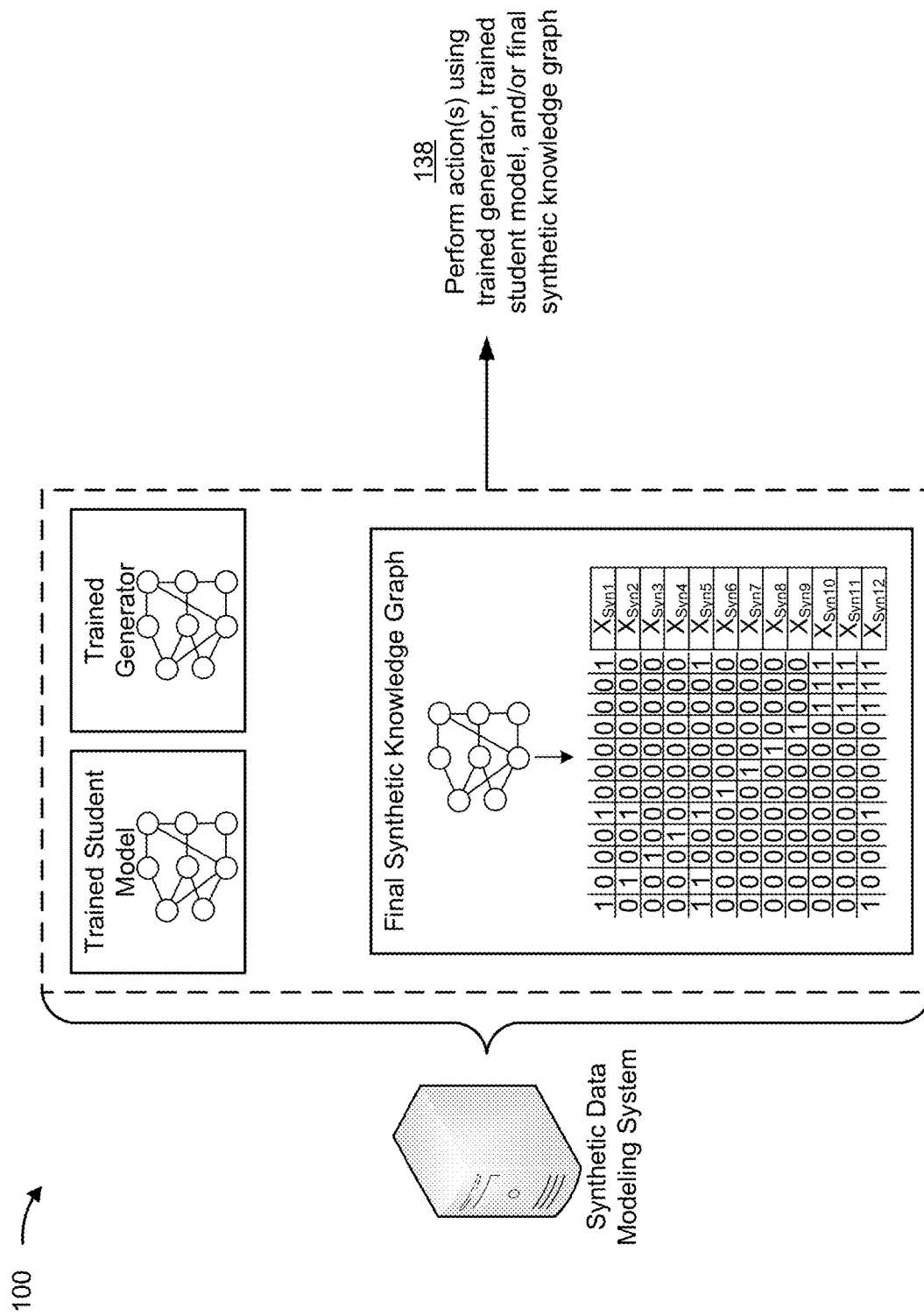

As shown in FIG. 1F, and by reference number 138, the synthetic data modeling system may perform one or more actions using the trained generator, the trained student model, and/or a final synthetic knowledge graph. A final synthetic knowledge graph may refer to a synthetic knowledge graph generated by the synthetic data modeling system during a final iteration of training the student model (e.g., a last iteration before the stopping condition is met, or an iteration during which the stopping condition is met). During training, the student model has a machine learning objective of minimizing the classification loss, and the generator has a machine learning objective of maximizing the classification loss. As result, the synthetic data modeling system may train the generator to generate a synthetic data set that has the same or similar statistical properties as the true data set, and the final synthetic knowledge graph may be representative of this synthetic data. Furthermore, using the operations described herein, the final synthetic knowledge graph may achieve differential privacy and/or may be a differentially private version of the true knowledge graph, and the generator may be trained to generate such as synthetic knowledge graph.

An example action performed by the synthetic data modeling system may be to publish, output, and/or store the generator (e.g., the generator model used to generate the final synthetic knowledge graph) and/or making the generator accessible for generating a synthetic knowledge graph (e.g., with differential privacy). For example, the synthetic data modeling system may publish the generator model (or information that can be used to recreate the generator model) via a website, in a message, via an application, and/or the like. Additionally, or alternatively, the synthetic data modeling system may provide access to the generator model via a website, an application, and/or the like. In this case, a user may interact with a device (e.g., a user device) to provide input to the generator model (e.g., a dataset or true knowledge graph). The generator model may process the input to generate an output (e.g., a synthetic knowledge graph), and may output the result (e.g., to the device). In some implementations, the generator model may select a random (or latent) value (e.g., using a Gaussian distribution), and may use the random value to generate a synthetic knowledge graph (e.g., a synthetic adjacency matrix and/or a synthetic attribute matrix). Each random value may result in a different synthetic knowledge graph, generated by the generator model, that has similar statistical properties as the true knowledge graph with which the generator model is trained.

In some implementations, the action may include publishing, outputting, and/or storing the final synthetic knowledge graph (and/or final synthetic data represented by the final synthetic knowledge graph). For example, the synthetic data modeling system may publish the final synthetic knowledge graph on a website, may provide the final synthetic knowledge graph in a message (e.g., an email message, a message in an application, and/or the like), may output the final synthetic knowledge graph for display, may output the final synthetic knowledge graph to another device (e.g., a user device) for display by the other device, and/or the like. Because the final synthetic knowledge graph is a differentially private version of the true knowledge graph, data privacy may be maintained using the techniques described herein. In some cases, a statistical analysis may be performed on the final synthetic knowledge graph, and the results of the statistical analysis may be similar to results that would have been obtained if the statistical analysis was performed on the true knowledge graph.

In some implementations, the action may include performing the statistical analysis. In this case, the synthetic data modeling system may perform the statistical analysis on the final synthetic knowledge graph, and may output a result of performing the statistical analysis. For example, the synthetic data modeling system may output the result for display, may output the result to another device (e.g., a user device) for display by the other device, and/or the like.

In some implementations, the action may include publishing, outputting, and/or storing the trained student model and/or making the trained student model accessible for analyzing a dataset (e.g., a knowledge graph). For example, the synthetic data modeling system may publish the trained student model (or information that can be used to recreate the trained student model) via a website, in a message, via an application, and/or the like. Additionally, or alternatively, the synthetic data modeling system may provide access to the trained student model via a website, an application, and/or the like. In this case, a user may interact with a device (e.g., a user device) to provide input to the trained student model (e.g., a dataset or knowledge graph). The trained student model may process the input to generate a result (e.g., a prediction), and may output the result (e.g., to the device). In some implementations, the trained student model may execute on the synthetic data modeling system.

Thus, implementations described herein enable a synthetic data modeling system to generate a differentially private synthetic knowledge graph that permits accurate statistical analyses to be performed. As a result, information security can be enhanced using differential privacy while also enabling highly relevant and accurate analyses to be performed on the differentially private synthetic knowledge graph.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
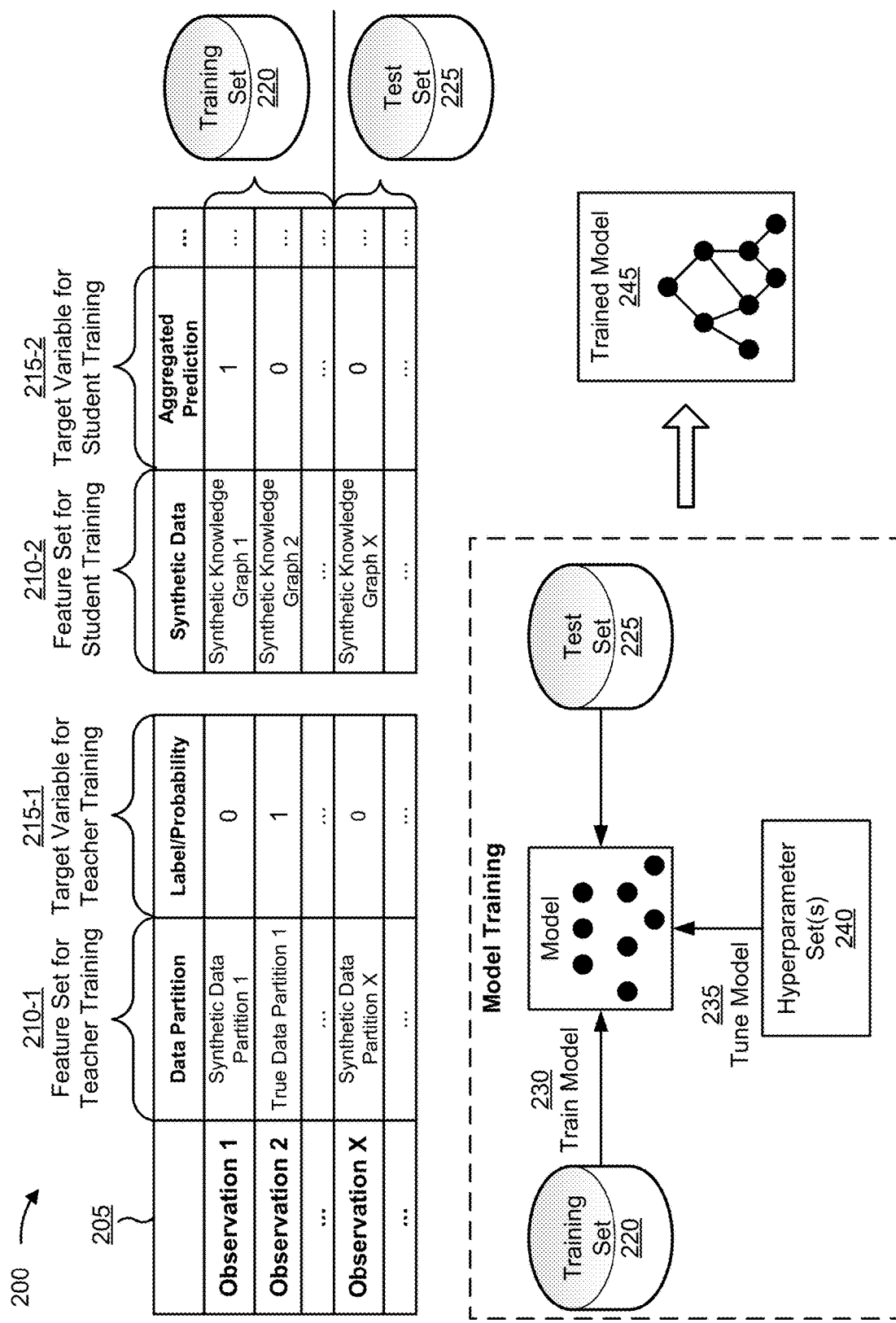
FIG. 2 is a diagram illustrating an example of training a machine learning model in connection with differentially private dataset generation and modeling for knowledge graphs.

FIG. 2 is a diagram illustrating an example 200 of training a machine learning model in connection with differentially private dataset generation and modeling for knowledge graphs. The machine learning model training described herein may be performed using a machine learning system. The machine learning system may include or may be included in a computing device, a server, a cloud computing environment, and/or the like, such as a synthetic data modeling system 401 described in more detail below.

As shown by reference number 205, a machine learning model may be trained using a set of observations. The set of observations may be obtained and/or input from historical data, such as data gathered during one or more processes described herein. For example, the set of observations may include data gathered from a data source 430, a user device 440, and/or the like, as described elsewhere herein. In some implementations, the machine learning system may receive the set of observations (e.g., as input) from the data source 430, the user device 440, and/or the like.

As shown by reference number 210 (e.g., 210-1 for training a teacher model and 210-2 for training a student model), a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from the data source 430, the user device 440, and/or the like. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from the data source 430, the user device 440, and/or the like, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations associated with training a teacher model may include a data partition (e.g., a synthetic data partition or a true data partition, as described above in connection with FIG. 1C), among other examples. As shown, for a first observation, the feature set may be for a synthetic data partition. These features and feature values are provided as examples, and may differ in other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 215 (e.g., 215-1 for training a teacher model and 215-2 for training a student model), the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values. In example 200, the target variable is a label or probability or confidence score associated with training a teacher model (as described above in connection with FIG. 1C), which has a value of 0 for the first observation, indicating that the first observation is for synthetic data.

The feature set and target variable described above are provided as examples, and other examples may differ from what is described above. For example, and as shown, a feature set for a set of observations associated with training a student model may include synthetic data, such as a synthetic knowledge graph (as described above in connection with FIG. 1D), among other examples. As shown, for a first observation, the feature set may include a first synthetic knowledge graph. In this case, the target variable may be an aggregated prediction for training the student model (as described above in connection with FIG. 1D), which has a value of 1 for the first observation, indicating a prediction that the first observation is for true data.

As another example (not shown), a feature set for a set of observations associated with training a generator (e.g., to generate a synthetic knowledge graph) may include a synthetic knowledge graph (e.g., generated by the generator) and a classification loss associated with the synthetic knowledge graph (as described above in connection with FIGS. 1C and 1E), among other examples. Additionally, or alternatively, the feature set may include metadata regarding the synthetic knowledge graph, such as a number of nodes included in the synthetic knowledge graph, a number of edges included in the synthetic knowledge graph, a ratio or relationship between the number of edges and the number of nodes in the synthetic knowledge graph, a number of edges associated with a node (e.g., for one or more nodes), a number of edges across a set of nodes, a number of attributes associated with a node, various attribute values of the attributes included in the synthetic knowledge graph, a number of nodes having a particular value for an attribute, one or more values for one or more elements an adjacency matrix, one or more values for one or more elements of an attribute matrix, and/or the like.

The synthetic data modeling system may use the classification losses to identify patterns associated with synthetic knowledge graphs having a high classification loss and patterns associated with synthetic knowledge graphs having a low classification loss. The synthetic data modeling system may generate a new synthetic knowledge graph using and/or based on one or both of those patterns, and may provide that synthetic knowledge graph as input for a subsequent iteration of training a teacher model (as described above in connection with FIG. 1C) or a student model (as described above in connection with FIG. 1E).

In some implementations, the synthetic data modeling system may predict a classification loss associated with a newly generated synthetic knowledge graph, in which case the classification loss may be a target variable for a feature set that includes a corresponding synthetic knowledge graph. In some implementations, the synthetic data modeling system may continue to generate synthetic knowledge graphs and predict classification losses for those synthetic knowledge graphs until the synthetic data modeling system generates a synthetic knowledge graph with a predicted classification loss that satisfies a threshold, and may provide this synthetic knowledge graph as input for training a teacher model and/or a student model. In some implementations, a stopping condition for training may be that the synthetic data modeling system generates a threshold number of synthetic knowledge graphs without any of those synthetic knowledge graphs resulting in a predicted classification loss that satisfies a threshold. In some implementations, the threshold may be different for different iterations. For example, the threshold may decrease for later iterations to account for better training of the teacher model and/or the student model.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
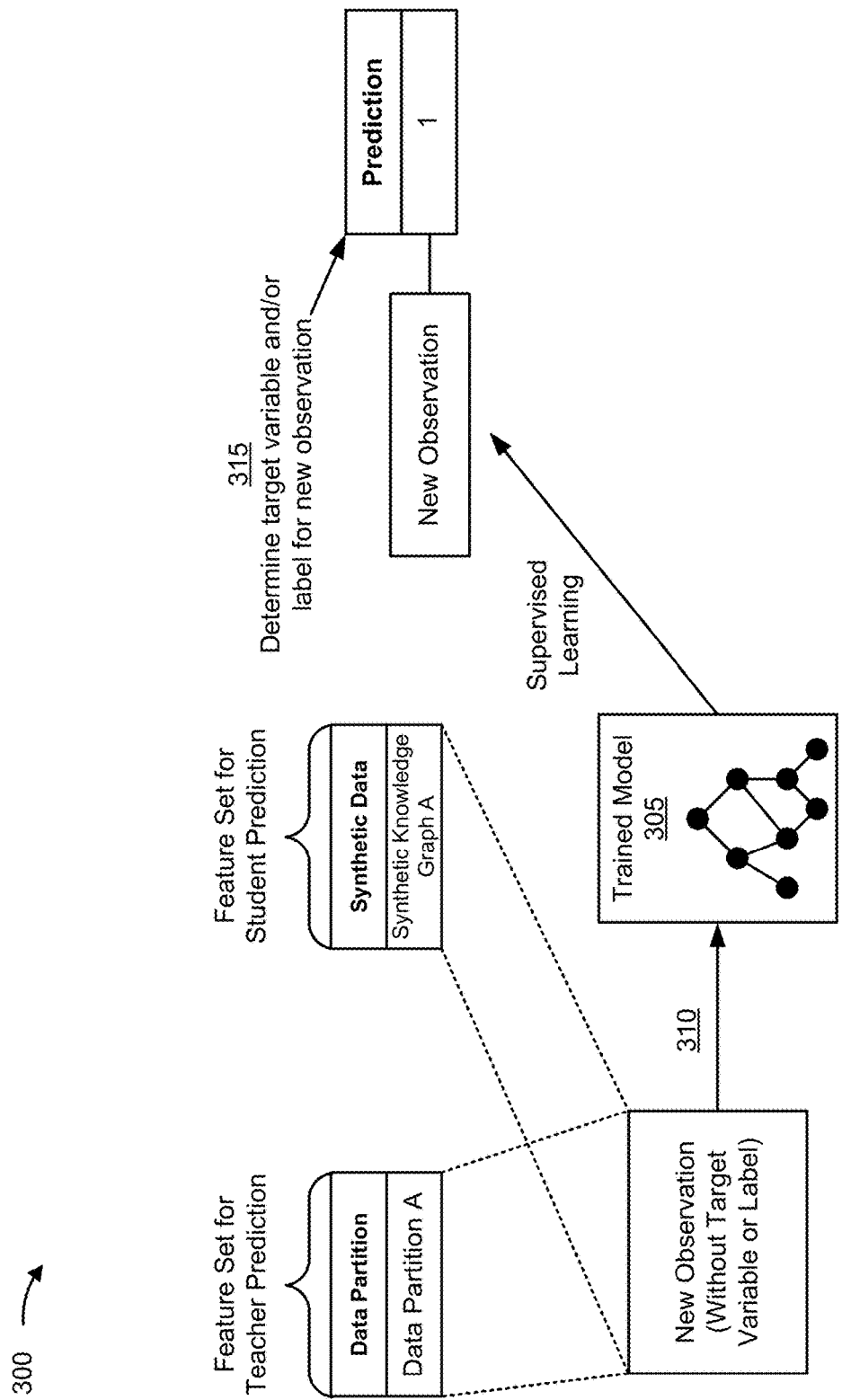
FIG. 3 is a diagram illustrating an example of applying a trained machine learning model to a new observation associated with differentially private dataset generation and modeling for knowledge graphs.

FIG. 3 is a diagram illustrating an example 300 of applying a trained machine learning model to a new observation associated with differentially private dataset generation and modeling for knowledge graphs. The new observation may be input to a machine learning system that stores a trained machine learning model 305. In some implementations, the trained machine learning model 305 may be the trained machine learning model 245 described above in connection with FIG. 2. The machine learning system may include or may be included in a computing device, a server, a cloud computing environment, and/or the like, such as a synthetic data modeling system 401.

As shown by reference number 310, the machine learning system may receive a new observation (or a set of new observations), and may input the new observation to the machine learning model 305. As shown, the new observation may include a feature of a data partition for a teacher model, as an example. As also shown, a new observation may include a feature of a synthetic knowledge graph for a student model, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 305 may predict a value of 0 for the target variable of prediction for the new observation, as shown by reference number 315, indicating a prediction that the new observation is true data. Based on this prediction (e.g., based on the value having a particular label or classification, based on the value satisfying or failing to satisfy a threshold, and/or the like), the machine learning system may provide output, such as outputting the value of the prediction, calculating a classification loss based on the prediction, providing feedback to a generator to generate a new synthetic knowledge graph, an indication that a stopping condition has been satisfied, and/or the like. In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

The recommendations and actions described above are provided as examples, and other examples may differ from what is described above. For example, a new observation for a generator may include a generated synthetic knowledge graph, and the target variable may include a predicted classification loss. In this case, the synthetic data modeling system may perform a first action, such as using the generated synthetic knowledge graph for a next iteration of training, if the predicted classification loss satisfies a threshold. In some implementations, the synthetic data modeling system may perform a second action, such as generating and predicting a classification loss for an additionally generated synthetic knowledge graph, if the predicted classification loss does not satisfy the threshold.

In this way, the machine learning system may apply a rigorous and automated process to differentially private dataset generation and modeling for knowledge graphs. The machine learning system enables recognition and/or identification of tens, hundreds, thousands, or millions of features and/or feature values for tens, hundreds, thousands, or millions of observations, thereby increasing accuracy and consistency and reducing delay associated with differentially private dataset generation and modeling for knowledge graphs relative to requiring computing resources to be allocated for tens, hundreds, or thousands of operators to manually generate and/or model differentially private knowledge graphs using the features or feature values.

As indicated above, FIG. 3 is provided as an example. Other examples may differ from what is described in connection with FIG. 3.

Figure 4:
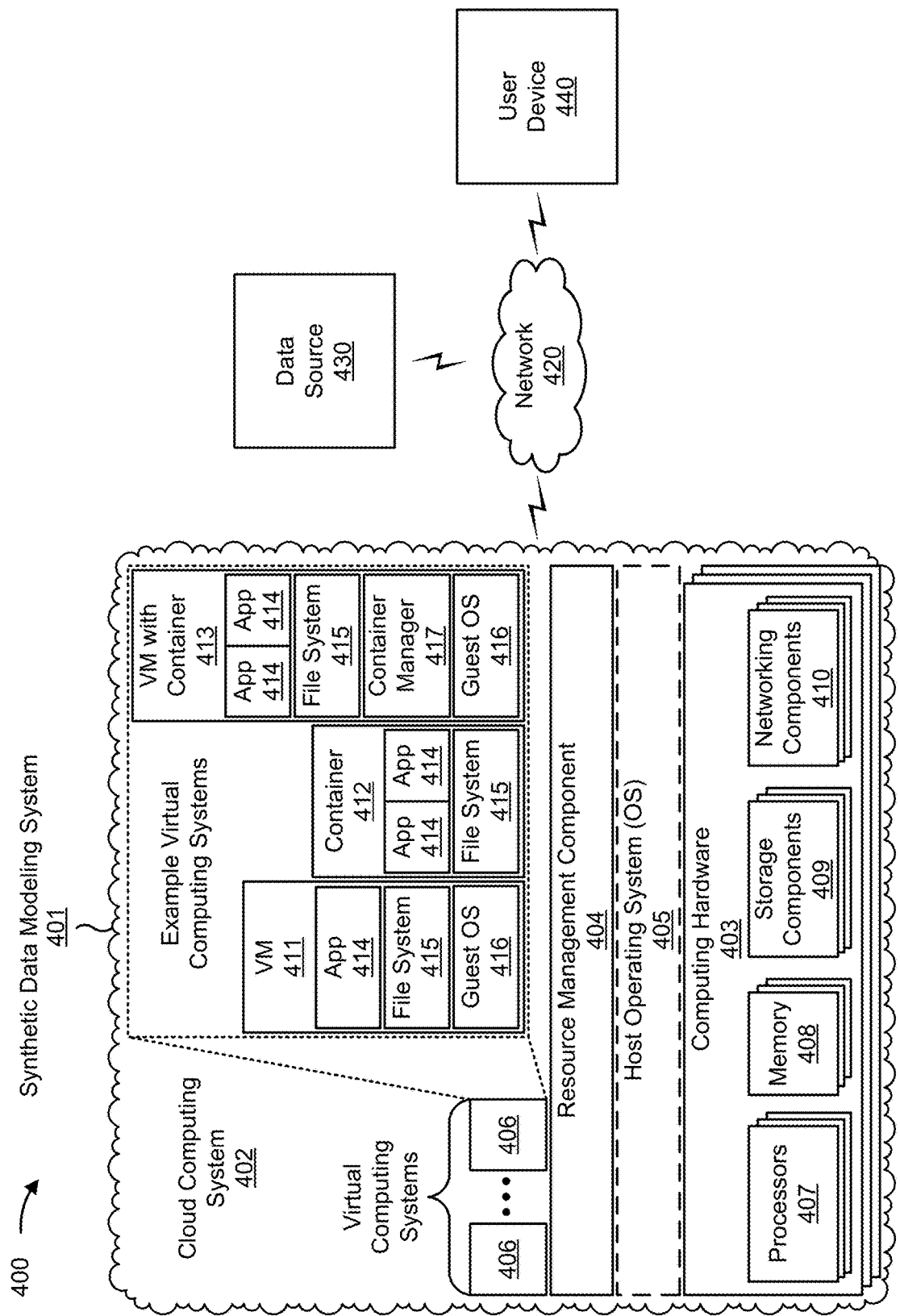
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a synthetic data modeling system 401. The synthetic data modeling system 401 may include one or more elements of a cloud computing system 402 and/or may execute within the cloud computing system 402 (e.g., as one or more virtual computing systems 406). The cloud computing system 402 may include one or more elements 403-417, as described in more detail below. As further shown in FIG. 4, environment 400 may include a network 420, a data source 430 and/or a user device 440. Devices of environment 400 may interconnect via wired connections, wireless connections, or a combination of wired and wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using such virtualization, the resource management component 404 enables a single computing device (e.g., a computer, a server, a host device, and/or the like) to operate as if the single computing device were multiple computing devices, such as by creating multiple isolated virtual computing systems 406 from computing hardware 403 of the single computing device. The multiple virtual computing systems 406 operate independently from one another and do not interact with one another. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server or host device) or from multiple computing devices (e.g., multiple servers or host devices), such as multiple computing devices in one or more data centers, server farms, server pools, and/or the like. As shown, computing hardware 403 may include one or more processors 407, one or more memories 408, one or more storage components 409, and/or one or more networking components 410. Computing hardware 403 may be interconnected via one or more wired and/or wireless buses, which may interconnect computing hardware 403 within a single computing device and/or across multiple computing devices.

A processor 407 includes a central processing unit, a graphics processing unit, and/or the like. A memory 408 includes random-access memory, read-only memory, and/or the like. The memory 408 may store a set of instructions (e.g., one or more instructions) for execution by the processor 407. The processor 407 may execute the set of instructions to perform one or more operations or processes described herein. In some implementations, execution of the set of instructions, by one or more processors 407, causes the one or more processors 407 and/or the synthetic data modeling system 401 to perform one or more operations or processes described herein. A storage component 409 includes a hard disk or another type of storage device that stores information, data, and/or software (e.g., code, instructions, and/or the like) related to the operation and use of the synthetic data modeling system 401. In some implementations, memory 408 and/or storage component 409 is/are implemented as a non-transitory computer readable medium. A networking component 410 includes a network interface and corresponding hardware that enables the synthetic data modeling system 401 to communicate with other devices of environment 400 via a wired connection and/or a wireless connection, such as via network 420. Additional examples of a processor, a memory, a storage component, and a networking component (e.g., a communication interface) are described elsewhere herein.

The resource management component 404 includes a virtualization application (e.g., executing on hardware, such as computing hardware 403) capable of virtualizing computing hardware 403 to start (e.g., create or spin up), stop (e.g., delete or tear down), and/or manage one or more virtual computing systems 406. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 404 may control access to and/or use of computing hardware 403 and/or software executing on computing hardware 403. Additionally, or alternatively, the resource management component 404 may perform binary rewriting to scan instructions received from a virtual computing system 406 and replace any privileged instructions with safe emulations of those instructions. The resource management component 404 may include a hypervisor or a virtual machine monitor, such as when the virtual computing systems 406 are virtual machines 411. Additionally, or alternatively, the resource management component 404 may include a container manager, such as when the virtual computing systems 406 are containers 412.

In some implementations, the resource management component 404 executes within and/or in coordination with a host operating system 405. For example, the resource management component 404 may execute on top of the host operating system 405 rather than interacting directly with computing hardware 403, such as when the resource management component 404 is a hosted hypervisor (e.g., a Type 2 hypervisor) or a container manager. In this case, the host operating system 405 may control access to and/or use of computing hardware 403 and/or software executing on computing hardware 403 based on information and/or instructions received from the resource management component 404. Alternatively, the resource management component 404 may interact directly with computing hardware 403 rather than interacting with the host operating system 405, such as when the resource management component 404 is a bare-metal hypervisor (e.g., a Type 1 hypervisor). Thus, in some implementations, the cloud computing system 402 does not include a host operating system 405. In some implementations, the host operating system 405 includes and/or executes an administrator application to enable a system administrator to manage, customize, and/or configure cloud computing system 402.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications 414 using a file system 415. The file system 415 may include binary files, software libraries, and/or other resources required to execute applications 414 on a guest operating system 416 or the host operating system 405. In some implementations, a virtual computing system 406 (e.g., a virtual machine 411 or a hybrid environment 413) includes a guest operating system 416. In some implementations, a virtual computing system 406 (e.g., a container 412 or a hybrid environment 413) includes a container manager 417.

A virtual machine 411 is an emulation of a computing device that enables execution of separate, isolated instances of virtual computing devices (e.g., multiple virtual machines 411) on the same computing hardware 403. The guest operating systems 416 and applications 414 of multiple virtual machines 411 may share computing hardware 403 from a single computing device or from multiple computing devices (e.g., a pool of computing devices). Each separate virtual machine 411 may include a guest operating system 416, a file system 415, and one or more applications 414. With a virtual machine 411, the underlying computing hardware 403 is virtualized, and the guest operating system 416 executes on top of this virtualized hardware. Using virtual machines 411 enables different types of guest operating systems 416 to execute on the same computing hardware 403 in an isolated environment, but with more resource usage and overhead than containers 412.

Unlike a virtual machine 411, a container 412 virtualizes a host operating system 405 rather than the underlying computing hardware 403. Thus, a container 412 does not require a guest operating system 416 because the application(s) 414 included in the container 412 execute directly on the host operating system 405 using a file system 415 included in the container 412. Each separate container 412 may share the kernel of the host operating system 405, and different applications 414 within a single container 412 may share a file system 415. This sharing of a file system 415 among multiple applications 414 reduces the need to reproduce operating system code for different applications, and enables a single host operating system 405 to execute multiple applications 414 and/or containers 412. As a result, containers 412 enable a greater quantity of applications 414 to execute on a smaller quantity of computing devices as compared to virtual machines 411.

A hybrid environment 413 includes elements of a virtual machine 411 and a container 412. For example, a hybrid environment 413 may include a guest operating system 416 that executes on top of virtualized hardware. A container manager 417 may execute on top of the guest operating system 416 to start, stop, and/or manage one or more containers within the hybrid environment 413. Using a hybrid environment 413 enables different types of guest operating systems 416 to execute on the same computing hardware 403 in an isolated environment, while also enabling lightweight containers to execute on top of the guest operating system 416.

The quantity of applications 414 shown in FIG. 4 as executing within each virtual computing system 406 is shown as an example, and a different quantity of applications 414 may execute within each virtual computing system. Furthermore, although the synthetic data modeling system 401 may include one or more elements 403-417 of the cloud computing system 402, may execute within the cloud computing system 402, and/or may be hosted within the cloud computing system 402, in some implementations, the synthetic data modeling system 401 may not be cloud-based (e.g., may be implemented outside of a cloud computing system) or may be partially cloud-based. For example, the synthetic data modeling system 401 may include one or more devices that are not part of the cloud computing system 402, such as device 500 of FIG. 5, which may include a standalone server or another type of computing device. The synthetic data modeling system 401 may perform one or more operations and/or processes described in more detail elsewhere herein.

Network 420 includes one or more wired and/or wireless networks. For example, network 420 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 420 enables communication among the devices of environment 400.

The data source 430 includes one or more devices capable of receiving, generating, storing, processing, and/or providing information associated with datasets, as described elsewhere herein. The data source 430 may include a communication device and/or a computing device. For example, the data source 430 may include a database, a server, an application server, a client server, a web server, a database server, a host server, a proxy server, a virtual server (e.g., executing on computing hardware), a server in a cloud computing system, a device that includes computing hardware used in a cloud computing environment, or a similar type of device. The transaction data source 430 may communicate with one or more other devices of environment 400, as described elsewhere herein.

The user device 440 includes one or more devices capable of receiving, generating, storing, processing, and/or providing information associated with transaction reconciliation, as described elsewhere herein. The user device 440 may include a communication device and/or a computing device. For example, the user device 440 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 440 may communicate with one or more other devices of environment 400, as described elsewhere herein. For example, the user device 440 may receive information from the synthetic data modeling system 401 (e.g., information associated with a recommendation of the synthetic data modeling system 401 and/or an action performed by the synthetic data modeling system 401). The user device 440 may output the information for display. Additionally, or alternatively, the user device 440 may receive user input (e.g., based on the displayed information) and may provide the user input to the synthetic data modeling system 401.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
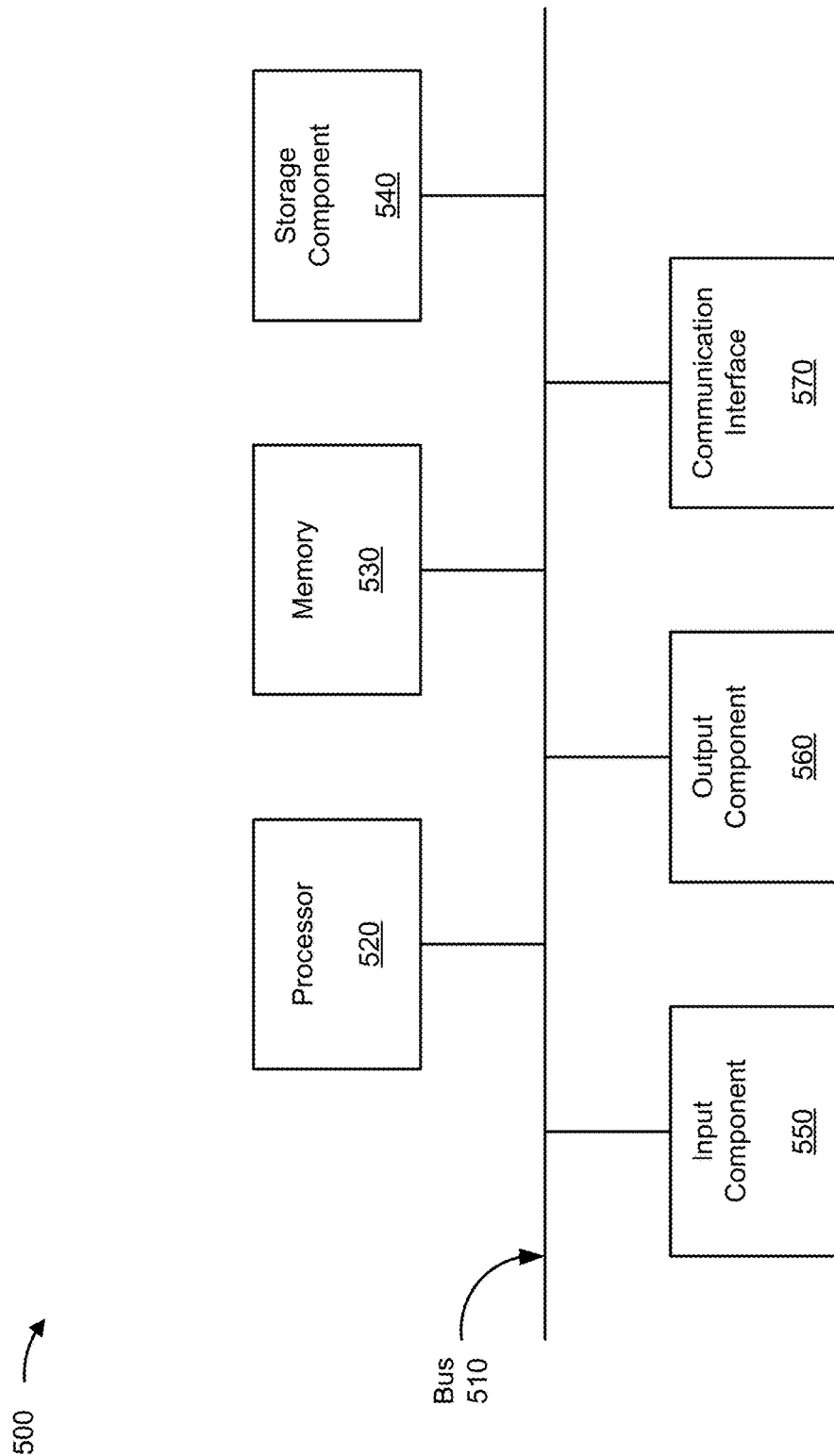
FIG. 5 is a diagram of example components of one or more devices of FIG. 4.

FIG. 5 is a diagram of example components of a device 500. Device 500 may correspond to synthetic data modeling system 401, data source 430, and/or user device 440. In some implementations, synthetic data modeling system 401, data source 430, and/or user device 440 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more LEDs).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, an RF interface, a universal serial bus (USB) interface, a wireless local area interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
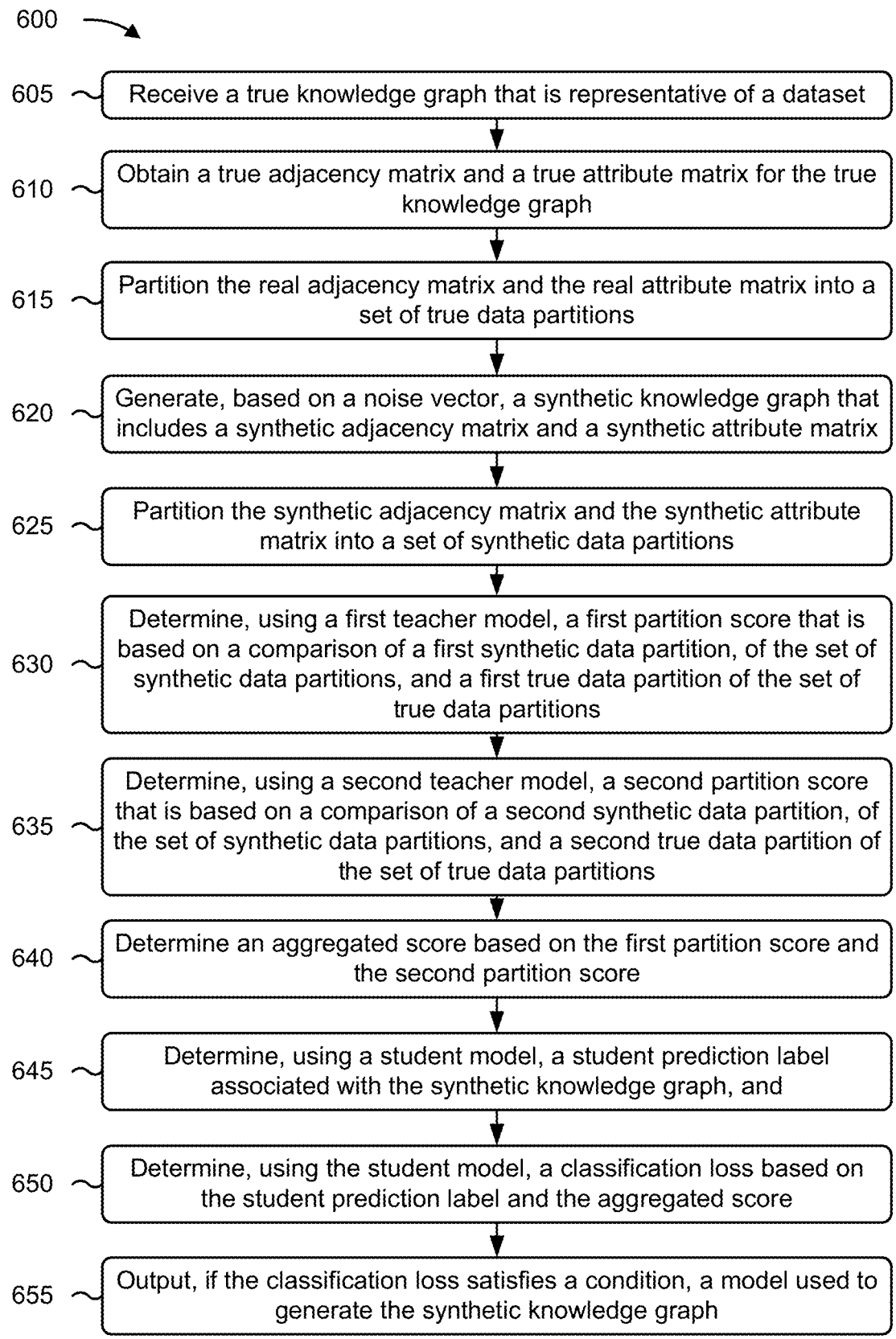
FIG. 6 is a flow chart of an example process relating to differentially private dataset generation and modeling for knowledge graphs.

FIG. 6 is a flow chart of an example process 600 associated with differentially private dataset generation and modeling for knowledge graphs. In some implementations, one or more process blocks of FIG. 6 may be performed by a device (e.g., synthetic data modeling system 401, device 500, and/or the like). In some implementations, one or more process blocks of FIG. 6 may be performed by another device or a group of devices separate from or including the device, such as a data source (e.g., data source 430), a user device (e.g., user device 440), and/or the like. Additionally, or alternatively, one or more process blocks of FIG. 6 may be performed by one or more components of a device 500, such as processor 520, memory 530, storage component 540, input component 550, output component 560, communication interface 570, and/or the like.

As shown in FIG. 6, process 600 may include receiving a true knowledge graph that is representative of a dataset (block 605). For example, the device may receive a true knowledge graph that is representative of a dataset, as described above. As further shown in FIG. 6, process 600 may include obtaining a true adjacency matrix and a true attribute matrix for the true knowledge graph (block 610). For example, the device may obtain a true adjacency matrix and a true attribute matrix for the true knowledge graph, as described above. As further shown in FIG. 6, process 600 may include partitioning the real adjacency matrix and the real attribute matrix into a set of true data partitions (block 615). For example, the device may partition the real adjacency matrix and the real attribute matrix into a set of true data partitions, as described above.

As further shown in FIG. 6, process 600 may include generating, based on a noise vector, a synthetic knowledge graph that includes a synthetic adjacency matrix and a synthetic attribute matrix (block 620). For example, the device may generate, based on a noise vector, a synthetic knowledge graph that includes a synthetic adjacency matrix and a synthetic attribute matrix, as described above. As further shown in FIG. 6, process 600 may include partitioning the synthetic adjacency matrix and the synthetic attribute matrix into a set of synthetic data partitions (block 625). For example, the device may partition the synthetic adjacency matrix and the synthetic attribute matrix into a set of synthetic data partitions, as described above.

As further shown in FIG. 6, process 600 may include determining, using a first teacher model, a first partition score that is based on a comparison of a first synthetic data partition, of the set of synthetic data partitions, and a first true data partition of the set of true data partitions (block 630). For example, the device may determine, using a first teacher model, a first partition score that is based on a comparison of a first synthetic data partition, of the set of synthetic data partitions, and a first true data partition of the set of true data partitions, as described above. As further shown in FIG. 6, process 600 may include determining, using a second teacher model, a second partition score that is based on a comparison of a second synthetic data partition, of the set of synthetic data partitions, and a second true data partition of the set of true data partitions (block 635). For example, the device may determine, using a second teacher model, a second partition score that is based on a comparison of a second synthetic data partition, of the set of synthetic data partitions, and a second true data partition of the set of true data partitions, as described above.

As further shown in FIG. 6, process 600 may include determining an aggregated score based on the first partition score and the second partition score (block 640). For example, the device may determine an aggregated score based on the first partition score and the second partition score, as described above. As further shown in FIG. 6, process 600 may include determining, using a student model, a student prediction label associated with the synthetic knowledge graph, and (block 645). For example, the device may determine, using a student model, a student prediction label associated with the synthetic knowledge graph, as described above.

As further shown in FIG. 6, process 600 may include determining, using the student model, a classification loss based on the student prediction label and the aggregated score (block 650). For example, the device may determine, using the student model, a classification loss based on the student prediction label and the aggregated score, as described above. As further shown in FIG. 6, process 600 may include outputting, if the classification loss satisfies a condition, a model used to generate the synthetic knowledge graph (block 655). For example, the device may output, if the classification loss satisfies a condition, a model used to generate the synthetic knowledge graph, as described above.

Process 600 may include additional implementations, such as any single implementation or any combination of implementations described below and/or in connection with one or more other processes described elsewhere herein.

In a first implementation, process 600 includes applying, by the device, noise to the aggregated score to generate an aggregate noise label as input to the student model, and the classification loss is determined based on the student prediction label and the aggregate noise label.

In a second implementation, alone or in combination with the first implementation, process 600 includes modifying, if the classification loss does not satisfy the condition, at least one of the synthetic knowledge graph, a teacher model, or the student model in an iterative manner.

In a third implementation, alone or in combination with one or more of the first and second implementations, process 600 includes determining, based on a parameter of the true knowledge graph, a quantity of partitions for the set of synthetic data partitions, wherein the parameter comprises at least one of: a quantity of nodes of the true knowledge graph, a quantity of edges of the true knowledge graph, an average quantity of attributes of the nodes, a variation of types of the attributes of the nodes, a variation of types of the edges of the true knowledge graph, or a type of the true knowledge graph.

In a fourth implementation, alone or in combination with one or more of the first through third implementations, the first teacher model and the second teacher model are trained using the true knowledge graph.

In a fifth implementation, alone or in combination with one or more of the first through fourth implementations, the first partition score indicates a first probability that the first synthetic data partition is true data or synthetic data and the second partition score indicates a second probability that the second synthetic data partition is true data or synthetic data.

In a sixth implementation, alone or in combination with one or more of the first through fifth implementations, the synthetic knowledge graph is partitioned using one of attribute partitioning or edge partitioning.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, a true knowledge graph that is representative of a dataset;
   obtaining, by the device, a true adjacency matrix and a true attribute matrix for the true knowledge graph;
   partitioning, by the device, the true adjacency matrix and the true attribute matrix into a set of true data partitions;
   generating, by the device and based on a noise vector, a synthetic knowledge graph that includes a synthetic adjacency matrix and a synthetic attribute matrix;
   partitioning, by the device, the synthetic adjacency matrix and the synthetic attribute matrix into a set of synthetic data partitions;
   determining, by the device and using a first teacher model, a first partition score that is based on a comparison of a first synthetic data partition, of the set of synthetic data partitions, and a first true data partition of the set of true data partitions;
   determining, by the device and using a second teacher model, a second partition score that is based on a comparison of a second synthetic data partition, of the set of synthetic data partitions, and a second true data partition of the set of true data partitions;
   determining, by the device, an aggregated score based on the first partition score and the second partition score;
   determining, by the device and using a student model, a student prediction label associated with the synthetic knowledge graph;
   determining, by the device and using the student model, a classification loss based on the student prediction label and the aggregated score; and
   outputting, by the device and if the classification loss satisfies a condition, a model used to generate the synthetic knowledge graph.

2. The method of claim 1, further comprising applying, by the device, noise to the aggregated score to generate an aggregate noise label as input to the student model, wherein the classification loss is determined based on the student prediction label and the aggregate noise label.

3. The method of claim 1, further comprising modifying, if the classification loss does not satisfy the condition, at least one of the synthetic knowledge graph, a teacher model, or the student model in an iterative manner.

4. The method of claim 1, further comprising:
   determining, based on a parameter of the true knowledge graph, a quantity of partitions for the set of synthetic data partitions, wherein the parameter comprises at least one of:
   a quantity of nodes of the true knowledge graph,
   a quantity of edges of the true knowledge graph,
   an average quantity of attributes of the nodes,
   a variation of types of the attributes of the nodes,
   a variation of types of the edges of the true knowledge graph, or
   a type of the true knowledge graph.

5. The method of claim 1, wherein the first teacher model and the second teacher model are trained using the true knowledge graph.

6. The method of claim 1, wherein the first partition score indicates a first probability that the first synthetic data partition is true data or synthetic data and the second partition score indicates a second probability that the second synthetic data partition is true data or synthetic data.

7. The method of claim 1, wherein the synthetic knowledge graph is partitioned using one of attribute partitioning or edge partitioning.

8. A device, comprising:
   one or more memories; and
   one or more processors communicatively coupled to the one or more memories, configured to:
   generate, using a graph generator model, a synthetic knowledge graph based on a true knowledge graph that is representative of a dataset;
   partition the synthetic knowledge graph into a set of synthetic data partitions;
   partition the true knowledge graph into a set of true data partitions;
   determine, using a first teacher model, a first prediction that is based on a first true data partition, of the set of true data partitions, and a first synthetic data partition of the set of synthetic data partitions;
   determine, using a second teacher model, a second prediction that is based on a second true data partition, of the set of true data partitions, and the true knowledge graph and a second synthetic data partition of the set of synthetic data partitions,
      wherein the first teacher model and the second teacher model are independently trained using disjoint data partitions of the true knowledge graph;
   determine, using a student model, a third prediction based on the synthetic knowledge graph,
      wherein the student model is trained based on historical synthetic knowledge graphs and historical output, from the first teacher model and the second teacher mode, corresponding to the historical synthetic knowledge graphs;
   determine a classification loss based on the third prediction and an aggregated prediction that is based on the first prediction, the second prediction, and noise; and
   perform an action, associated with the synthetic knowledge graph or a model used to generate the synthetic knowledge graph, based on the classification loss.

9. The device of claim 8, wherein the synthetic knowledge graph includes a synthetic adjacency matrix and a synthetic attribute matrix, and wherein the true knowledge graph includes a true adjacency matrix and a true attribute matrix.

10. The device of claim 8, wherein the set of synthetic data partitions are partitioned based on at least one of edge partitioning or attribute partitioning.

11. The device of claim 8, wherein the first teacher model and the second teacher model are discriminator models that are trained using separate sets of partitioned training data.

12. The device of claim 11, wherein the first teacher model is trained based on first partitioned training data of the separate sets of partitioned training data,
   wherein the first partitioned training data is associated with first historical partitions of previously generated synthetic knowledge graphs and a first true data partition of the true knowledge graph, and wherein the second teacher model is trained based on second partitioned training data of the separate sets of partitioned training data,
wherein the second partitioned training data is associated with second historical partitions of the previously generated synthetic knowledge graphs and a second true data partition of the true knowledge graph.

13. The device of claim 8, wherein the one or more processors, when performing the action, are configured to:
determine that a convergence condition is satisfied; and
output at least one of the synthetic knowledge graph or the student model based on determining that the convergence condition is satisfied.

14. The device of claim 8, wherein the one or more processors, when performing the action, are configured to:
determine that a convergence condition is not satisfied;
generate a new synthetic knowledge graph based on the classification loss and based on determining that the convergence condition is not satisfied; and
provide the new synthetic knowledge graph as input to the first teacher model, the second teacher model, and the student model.

15. A non-transitory computer-readable medium storing instructions, the instructions comprising:
one or more instructions that, when executed by one or more processors, cause the one or more processors to:
generate a synthetic knowledge graph based on a true knowledge graph that includes data;
partition the synthetic knowledge graph into a set of synthetic data partitions;
determine, using a plurality of teacher models, an aggregated prediction that indicates a first probability that the synthetic knowledge graph represents true data or synthetic data,
wherein the aggregated prediction is based on individual predictions from corresponding individual teacher models included in the plurality of teacher models;
determine, using a student model and based on the synthetic knowledge graph, a student prediction that indicates a second probability that the synthetic knowledge graph represents true data or synthetic data,
wherein the student model is trained based on historical synthetic knowledge graphs and historical aggregated predictions associated with the plurality of teacher models;
apply noise to the aggregated prediction to generate a noisy aggregation prediction;
determine an error metric based on the noisy aggregated prediction and the student prediction; and
perform an action associated with the synthetic knowledge graph or a model used to generate the synthetic knowledge graph based on the error metric.

16. The non-transitory computer-readable medium of claim 15, wherein the noise impacts a vote count of the plurality of teacher models.

17. The non-transitory computer-readable medium of claim 15, wherein a quantity of teacher models, included in the plurality of teacher models, and a quantity synthetic data partitions, included in the set of synthetic data partitions, are the same.

18. The non-transitory computer-readable medium of claim 15, wherein the synthetic knowledge graph is provided as input to the plurality of teacher models and the student model based on a predicted error metric calculated for the synthetic knowledge graph.

19. The non-transitory computer-readable medium of claim 15, wherein the synthetic knowledge graph is partitioned using one of attribute partitioning or edge partitioning.

20. The non-transitory computer-readable medium of claim 15, wherein the one or more instructions, that cause the one or more processors to perform the action, cause the one or more processors to:
output the synthetic knowledge graph as a differentially private version of the data,
output or store the model used to generate the synthetic knowledge graph, or
train the generator model and the student model based on the synthetic knowledge graph and the error metric.

* * * * *